United States Patent
Stephens et al.

(10) Patent No.: US 11,691,493 B2
(45) Date of Patent: Jul. 4, 2023

(54) VEHICLE BATTERY TRAY HAVING TUB-BASED COMPONENT

(71) Applicant: Shape Corp., Grand Haven, MI (US)

(72) Inventors: Mark Charles Stephens, Grand Rapids, MI (US); Joseph Robert Matecki, Allendale, MI (US); Bob Brady, Muskegon, MI (US); Matthew Kuipers, Holland, MI (US); Paul Michael Roehm, Grand Haven, MI (US)

(73) Assignee: Shape Corp., Grand Haven, MI (US)

( * ) Notice: Subject to any disclaimer, the term of this patent is extended or adjusted under 35 U.S.C. 154(b) by 104 days.

(21) Appl. No.: 17/113,968

(22) Filed: Dec. 7, 2020

(65) Prior Publication Data

US 2021/0111388 A1 Apr. 15, 2021

Related U.S. Application Data

(63) Continuation of application No. 15/980,249, filed on May 15, 2018, now Pat. No. 10,886,513.
(Continued)

(51) Int. Cl.
*B60K 1/04* (2019.01)
*B60L 50/60* (2019.01)
(Continued)

(52) U.S. Cl.
CPC ............... *B60K 1/04* (2013.01); *B60L 50/64* (2019.02); *B60L 50/66* (2019.02);
(Continued)

(58) Field of Classification Search
CPC ............ H01M 50/20; H01M 10/6572; H01M 2200/20; B60L 50/64; B60L 50/66; B60K 1/04; B60K 2001/0438
(Continued)

(56) References Cited

U.S. PATENT DOCUMENTS 3,708,028 A 1/1973 Hafer
3,930,552 A 1/1976 Kunkle et al.
(Continued)

FOREIGN PATENT DOCUMENTS

AT 511428 A1 11/2012
AT 511670 A1 1/2013
(Continued)

OTHER PUBLICATIONS

Korean Intellectual Property Office (ISA), International Search Report and Written Opinion for International Application No. PCT/US2018/032760, dated Sep. 11, 2018.
(Continued)

*Primary Examiner* — James M Erwin

(74) *Attorney, Agent, or Firm* — Bodman PLC

(57) ABSTRACT

A battery tray for an electric vehicle includes a tub component that has a floor portion and a perimeter wall portion that integrally extends upward around a peripheral edge of the floor portion to border a battery containment area of the tub component. The tub component may include a plurality of cross member portions that integrally interconnect with the floor portion and the perimeter wall portion so as to span laterally across the battery containment area to divide the battery containment area into separate compartments. A support structure of the battery tray may have an elongated member coupled at an exterior side of each of opposing longitudinal sections of the perimeter wall portion of the tub component.

20 Claims, 23 Drawing Sheets

Related U.S. Application Data

(60) Provisional application No. 62/643,345, filed on Mar. 15, 2018.

(51) Int. Cl.

| | |
|---|---|
| *B60L 50/64* | (2019.01) |
| *H01M 50/271* | (2021.01) |
| *H01M 50/224* | (2021.01) |
| H01M 10/6572 | (2014.01) |
| H01M 50/204 | (2021.01) |

(52) U.S. Cl.
CPC ....... *H01M 50/224* (2021.01); *H01M 50/271* (2021.01); *B60K 2001/0438* (2013.01); *H01M 10/6572* (2015.04); *H01M 50/204* (2021.01); *H01M 2220/20* (2013.01)

(58) Field of Classification Search
USPC .......................................................... 429/96
See application file for complete search history.

(56) References Cited

U.S. PATENT DOCUMENTS

| | | | |
|---|---|---|---|
| 3,983,952 A | 10/1976 | McKee | |
| 4,174,014 A | 11/1979 | Bjorksten | |
| 4,252,206 A | 2/1981 | Burkholder et al. | |
| 4,317,497 A | 3/1982 | Alt et al. | |
| 4,339,015 A | 7/1982 | Fowkes et al. | |
| 4,506,748 A | 3/1985 | Thomas | |
| 5,015,545 A | 5/1991 | Brooks | |
| 5,198,638 A | 3/1993 | Massacesi | |
| 5,378,555 A | 1/1995 | Waters et al. | |
| 5,390,754 A | 2/1995 | Masuyama et al. | |
| 5,392,873 A | 2/1995 | Masuyama et al. | |
| 5,476,151 A | 12/1995 | Tsuchida et al. | |
| 5,501,289 A | 3/1996 | Nishikawa et al. | |
| 5,513,721 A | 5/1996 | Ogawa et al. | |
| 5,523,666 A | 6/1996 | Hoelzl et al. | |
| 5,534,364 A | 7/1996 | Watanabe et al. | |
| 5,549,443 A | 8/1996 | Hammerslag | |
| 5,555,950 A | 9/1996 | Harada et al. | |
| 5,558,949 A | 9/1996 | Iwatsuki et al. | |
| 5,561,359 A | 10/1996 | Matsuura et al. | |
| 5,567,542 A | 10/1996 | Bae | |
| 5,585,204 A | 12/1996 | Oshida et al. | |
| 5,585,205 A | 12/1996 | Kohchi | |
| 5,612,606 A | 3/1997 | Guimarin et al. | |
| 5,620,057 A | 4/1997 | Klemen et al. | |
| 5,709,280 A | 1/1998 | Beckley et al. | |
| 5,736,272 A | 4/1998 | Veenstra et al. | |
| 5,760,569 A | 6/1998 | Chase, Jr. | |
| 5,833,023 A | 11/1998 | Shimizu | |
| 5,853,058 A | 12/1998 | Endo et al. | |
| 5,866,276 A | 2/1999 | Ogami et al. | |
| 5,934,053 A | 8/1999 | Fillman et al. | |
| 6,040,080 A | 3/2000 | Minami et al. | |
| 6,079,984 A | 6/2000 | Torres et al. | |
| 6,085,854 A | 7/2000 | Nishikawa | |
| 6,094,927 A | 8/2000 | Anazawa et al. | |
| 6,109,380 A | 8/2000 | Veenstra | |
| 6,130,003 A | 10/2000 | Etoh et al. | |
| 6,158,538 A | 12/2000 | Botzelmann et al. | |
| 6,188,574 B1 | 2/2001 | Anazawa | |
| 6,189,635 B1 | 2/2001 | Schuler et al. | |
| 6,220,380 B1 | 4/2001 | Mita et al. | |
| 6,227,322 B1 | 5/2001 | Nishikawa | |
| 6,260,645 B1 | 7/2001 | Pawlowski et al. | |
| 6,402,229 B1 | 6/2002 | Suganuma | |
| 6,406,812 B1 | 6/2002 | Dreulle et al. | |
| 6,462,949 B1 | 10/2002 | Parish, IV et al. | |
| 6,541,151 B2 | 4/2003 | Minamiura et al. | |
| 6,541,154 B2 | 4/2003 | Oogami et al. | |
| 6,565,836 B2 | 5/2003 | Ovshinsky et al. | |
| 6,598,691 B2 | 7/2003 | Mita et al. | |
| 6,648,090 B2 | 11/2003 | Iwase | |
| 6,668,957 B2 | 12/2003 | King | |
| 6,736,229 B1 | 5/2004 | Amori et al. | |
| 6,811,197 B1 | 11/2004 | Grabowski et al. | |
| 7,004,274 B2 | 2/2006 | Shibasawa et al. | |
| 7,017,361 B2 | 3/2006 | Kwon | |
| 7,070,015 B2 | 7/2006 | Mathews et al. | |
| 7,128,999 B1 | 10/2006 | Martin et al. | |
| 7,201,384 B2 | 4/2007 | Chaney | |
| 7,207,405 B2 | 4/2007 | Reid et al. | |
| 7,221,123 B2 | 5/2007 | Chen | |
| 7,249,644 B2 | 7/2007 | Honda et al. | |
| 7,267,190 B2 | 9/2007 | Hirano | |
| 7,323,272 B2 | 1/2008 | Ambrosio et al. | |
| 7,401,669 B2 | 7/2008 | Fujii et al. | |
| 7,405,022 B2 | 7/2008 | Kang et al. | |
| 7,412,309 B2 | 8/2008 | Honda | |
| 7,416,039 B1 | 8/2008 | Anderson et al. | |
| 7,424,926 B2 | 9/2008 | Tsuchiya | |
| 7,427,156 B2 | 9/2008 | Ambrosio et al. | |
| 7,501,793 B2 | 3/2009 | Kadouchi et al. | |
| 7,507,499 B2 | 3/2009 | Zhou et al. | |
| 7,520,355 B2 | 4/2009 | Chaney | |
| 7,610,978 B2 | 11/2009 | Takasaki et al. | |
| 7,654,351 B2 | 2/2010 | Koike et al. | |
| 7,654,352 B2 | 2/2010 | Takasaki et al. | |
| 7,661,370 B2 | 2/2010 | Pike et al. | |
| 7,686,111 B2 | 3/2010 | Koenekamp et al. | |
| 7,687,192 B2 | 3/2010 | Yoon et al. | |
| 7,713,655 B2 | 5/2010 | Ha et al. | |
| 7,749,644 B2 | 7/2010 | Nishino | |
| 7,807,288 B2 | 10/2010 | Yoon et al. | |
| 7,854,282 B2 | 12/2010 | Lee et al. | |
| 7,858,229 B2 | 12/2010 | Shin et al. | |
| 7,875,378 B2 | 1/2011 | Yang et al. | |
| 7,879,480 B2 | 2/2011 | Yoon et al. | |
| 7,879,485 B2 | 2/2011 | Yoon et al. | |
| 7,926,602 B2 | 4/2011 | Takasaki | |
| 7,931,105 B2 | 4/2011 | Sato et al. | |
| 7,948,207 B2 | 5/2011 | Scheucher | |
| 7,967,093 B2 | 6/2011 | Nagasaka | |
| 7,984,779 B2 | 7/2011 | Boegelein et al. | |
| 7,990,105 B2 | 8/2011 | Matsumoto et al. | |
| 7,993,155 B2 | 8/2011 | Heichal et al. | |
| 7,997,368 B2 | 8/2011 | Takasaki et al. | |
| 8,006,626 B2 | 8/2011 | Kumar et al. | |
| 8,006,793 B2 | 8/2011 | Heichal et al. | |
| 8,012,620 B2 | 9/2011 | Takasaki et al. | |
| 8,034,476 B2 | 10/2011 | Ha et al. | |
| 8,037,954 B2 | 10/2011 | Taguchi | |
| 8,079,435 B2 | 12/2011 | Takasaki et al. | |
| 8,091,669 B2 | 1/2012 | Taneda et al. | |
| 8,110,300 B2 | 2/2012 | Niedzwiecki et al. | |
| 8,146,694 B2 | 4/2012 | Hamidi | |
| 8,163,420 B2 | 4/2012 | Okada et al. | |
| 8,167,070 B2 | 5/2012 | Takamura et al. | |
| 8,186,468 B2 | 5/2012 | Parrett et al. | |
| 8,187,736 B2 | 5/2012 | Park et al. | |
| 8,205,702 B2 | 6/2012 | Hoermandinger et al. | |
| 8,206,846 B2 | 6/2012 | Yang et al. | |
| 8,210,301 B2 | 7/2012 | Hashimoto et al. | |
| 8,211,564 B2 | 7/2012 | Choi et al. | |
| 8,256,552 B2 | 9/2012 | Okada | |
| 8,268,469 B2 | 9/2012 | Hermann et al. | |
| 8,268,472 B2 | 9/2012 | Ronning et al. | |
| 8,276,697 B2 | 10/2012 | Takasaki | |
| 8,286,743 B2 | 10/2012 | Rawlinson | |
| 8,298,698 B2 | 10/2012 | Chung et al. | |
| 8,304,104 B2 | 11/2012 | Lee et al. | |
| 8,307,930 B2 | 11/2012 | Sailor et al. | |
| 8,323,819 B2 | 12/2012 | Lee et al. | |
| 8,327,962 B2 | 12/2012 | Bergmeier et al. | |
| 8,343,647 B2 | 1/2013 | Ahn et al. | |
| 8,353,374 B2 | 1/2013 | Sugawara et al. | |
| 8,371,401 B1 | 2/2013 | Illustrato | |
| 8,397,853 B2 | 3/2013 | Stefani et al. | |
| 8,409,743 B2 | 4/2013 | Okada et al. | |
| 8,418,795 B2 | 4/2013 | Sasage et al. | |
| 8,420,245 B2 | 4/2013 | Im et al. | |

(56) References Cited

U.S. PATENT DOCUMENTS

| | | |
|---|---|---|
| 8,439,144 B2 | 5/2013 | Murase |
| 8,453,773 B2 | 6/2013 | Hill et al. |
| 8,453,778 B2 | 6/2013 | Bannier et al. |
| 8,455,122 B2 | 6/2013 | Shin et al. |
| 8,465,866 B2 | 6/2013 | Kim |
| 8,481,343 B2 | 7/2013 | Hsin et al. |
| 8,486,557 B2 | 7/2013 | Lee et al. |
| 8,492,016 B2 | 7/2013 | Shin et al. |
| 8,501,344 B2 | 8/2013 | Yang et al. |
| 8,511,412 B2 | 8/2013 | Kawaguchi et al. |
| 8,540,282 B2 | 9/2013 | Yoda et al. |
| 8,551,640 B2 | 10/2013 | Hedrich et al. |
| 8,557,425 B2 | 10/2013 | Ronning et al. |
| 8,561,743 B2 | 10/2013 | Iwasa et al. |
| 8,563,155 B2 | 10/2013 | Lee et al. |
| 8,567,543 B2 | 10/2013 | Kubota et al. |
| 8,584,780 B2 | 11/2013 | Yu et al. |
| 8,587,907 B2 | 11/2013 | Gaben |
| 8,592,069 B1 | 11/2013 | Anderson et al. |
| 8,602,139 B2 | 12/2013 | Takamura et al. |
| 8,609,271 B2 | 12/2013 | Yoon et al. |
| 8,658,303 B2 | 2/2014 | Chung et al. |
| 8,672,077 B2 | 3/2014 | Sand et al. |
| 8,672,354 B2 | 3/2014 | Kim et al. |
| 8,689,918 B2 | 4/2014 | Yu et al. |
| 8,689,919 B2 | 4/2014 | Maeda et al. |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 | 6/2014 | Hashimoto et al. |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 | 5/2015 | Rawlinson |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,073,498 B2 | 7/2015 | Lee |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,505 B2 | 3/2016 | Hihara et al. |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |
| 9,434,243 B2 | 9/2016 | Nakao |
| 9,434,270 B1 | 9/2016 | Penilla et al. |
| 9,434,333 B2 | 9/2016 | Sloan et al. |
| 9,444,082 B2 | 9/2016 | Tsujimura et al. |

(56) References Cited

U.S. PATENT DOCUMENTS

| | | |
|---|---|---|
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |
| 9,484,592 B2 | 11/2016 | Roh et al. |
| 9,487,237 B1 | 11/2016 | Vollmer |
| 9,502,700 B2 | 11/2016 | Haussman |
| 9,520,624 B2 | 12/2016 | Lee et al. |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |
| 9,561,735 B2 | 2/2017 | Nozaki |
| 9,564,663 B2 | 2/2017 | Kim et al. |
| 9,564,664 B2 | 2/2017 | Tanigaki et al. |
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,718,340 B2 | 8/2017 | Berger et al. |
| 9,789,908 B2 | 10/2017 | Tsukada et al. |
| 9,796,424 B2 | 10/2017 | Sakaguchi et al. |
| 9,802,650 B2 | 10/2017 | Nishida et al. |
| 10,059,382 B2 | 8/2018 | Nusier et al. |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2008/0318119 A1 | 12/2008 | Watanabe et al. |
| 2009/0014221 A1 | 1/2009 | Kim et al. |
| 2009/0058355 A1 | 3/2009 | Meyer |
| 2009/0186266 A1 | 7/2009 | Nishino et al. |
| 2010/0025131 A1 | 2/2010 | Gloceri et al. |
| 2010/0112419 A1 | 5/2010 | Jang et al. |
| 2010/0159317 A1 | 6/2010 | Taghikhani et al. |
| 2010/0173191 A1 | 7/2010 | Meintschel et al. |
| 2010/0307848 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1 | 6/2011 | Nakamori |
| 2011/0168461 A1 | 7/2011 | Meyer-Ebeling |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0129031 A1 | 5/2012 | Kim |
| 2012/0160583 A1 | 6/2012 | Rawlinson |
| 2012/0223113 A1 | 9/2012 | Gaisne et al. |
| 2012/0298433 A1 | 11/2012 | Ohkura |
| 2012/0301765 A1 | 11/2012 | Loo et al. |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |
| 2015/0188207 A1 | 7/2015 | Son et al. |
| 2015/0204583 A1 | 7/2015 | Stephan et al. |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0259011 A1 | 9/2015 | Deckard et al. |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |

(56) References Cited

U.S. PATENT DOCUMENTS

| | | |
|---|---|---|
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |
| 2016/0133899 A1 | 5/2016 | Qiao et al. |
| 2016/0137046 A1 | 5/2016 | Song |
| 2016/0141738 A1 | 5/2016 | Kwag |
| 2016/0149177 A1 | 5/2016 | Sugeno et al. |
| 2016/0156005 A1 | 6/2016 | Elliot et al. |
| 2016/0159221 A1 | 6/2016 | Chen et al. |
| 2016/0164053 A1 | 6/2016 | Lee et al. |
| 2016/0167544 A1 | 6/2016 | Barbat et al. |
| 2016/0176312 A1 | 6/2016 | Duhaime et al. |
| 2016/0197332 A1 | 7/2016 | Lee et al. |
| 2016/0197386 A1 | 7/2016 | Moon et al. |
| 2016/0197387 A1 | 7/2016 | Lee et al. |
| 2016/0204398 A1 | 7/2016 | Moon et al. |
| 2016/0207418 A1 | 7/2016 | Bergstrom et al. |
| 2016/0218335 A1 | 7/2016 | Baek |
| 2016/0222631 A1 | 8/2016 | Kohno et al. |
| 2016/0226040 A1 | 8/2016 | Mongeau et al. |
| 2016/0226108 A1 | 8/2016 | Kim et al. |
| 2016/0229309 A1 | 8/2016 | Mitsutani |
| 2016/0233468 A1 | 8/2016 | Nusier et al. |
| 2016/0236713 A1 | 8/2016 | Sakaguchi et al. |
| 2016/0248060 A1 | 8/2016 | Brambrink et al. |
| 2016/0248061 A1 | 8/2016 | Brambrink et al. |
| 2016/0257219 A1 | 9/2016 | Miller et al. |
| 2016/0280306 A1 | 9/2016 | Miyashiro et al. |
| 2016/0308180 A1 | 10/2016 | Kohda |
| 2016/0318579 A1 | 11/2016 | Miyashiro |
| 2016/0339855 A1 | 11/2016 | Chinavare et al. |
| 2016/0347161 A1 | 12/2016 | Kusumi et al. |
| 2016/0361984 A1 | 12/2016 | Manganaro |
| 2016/0368358 A1 | 12/2016 | Nagaosa |
| 2016/0375750 A1 | 12/2016 | Hokazono et al. |
| 2017/0001507 A1 | 1/2017 | Ashraf et al. |
| 2017/0005303 A1 | 1/2017 | Harris et al. |
| 2017/0005371 A1 | 1/2017 | Chidester et al. |
| 2017/0005375 A1 | 1/2017 | Walker |
| 2017/0029034 A1 | 2/2017 | Faruque et al. |
| 2017/0047563 A1 | 2/2017 | Lee et al. |
| 2017/0050533 A1 | 2/2017 | Wei et al. |
| 2017/0054120 A1 | 2/2017 | Templeman et al. |
| 2017/0062782 A1 | 3/2017 | Cho et al. |
| 2017/0084890 A1 | 3/2017 | Subramanian et al. |
| 2017/0088013 A1 | 3/2017 | Shimizu et al. |
| 2017/0088178 A1 | 3/2017 | Tsukada et al. |
| 2017/0106907 A1 | 4/2017 | Gong et al. |
| 2017/0106908 A1 | 4/2017 | Song |
| 2017/0144566 A1 | 5/2017 | Aschwer et al. |
| 2017/0190243 A1 | 7/2017 | Duan et al. |
| 2017/0194681 A1 | 7/2017 | Kim et al. |
| 2017/0200925 A1 | 7/2017 | Seo et al. |
| 2017/0214018 A1 | 7/2017 | Sun et al. |
| 2017/0222199 A1 | 8/2017 | Idikurt et al. |
| 2017/0232859 A1 | 8/2017 | Li |
| 2017/0288185 A1 | 10/2017 | Maguire |
| 2017/0331086 A1 | 11/2017 | Frehn et al. |
| 2018/0050607 A1 | 2/2018 | Matecki et al. |
| 2018/0062224 A1 | 3/2018 | Drabon et al. |
| 2018/0154754 A1 | 6/2018 | Rowley et al. |
| 2018/0186227 A1 | 7/2018 | Stephens et al. |
| 2018/0229593 A1 | 8/2018 | Hitz et al. |
| 2018/0233789 A1 | 8/2018 | Iqbal et al. |
| 2018/0236863 A1 | 8/2018 | Kawabe et al. |
| 2018/0237075 A1 | 8/2018 | Kawabe et al. |
| 2018/0323409 A1 | 11/2018 | Maier |
| 2018/0334022 A1 | 11/2018 | Rawlinson et al. |
| 2018/0337374 A1 | 11/2018 | Matecki et al. |
| 2018/0337377 A1 | 11/2018 | Stephens et al. |
| 2018/0337378 A1 | 11/2018 | Stephens et al. |
| 2019/0081298 A1 | 3/2019 | Matecki et al. |
| 2019/0100090 A1 | 4/2019 | Matecki et al. |

FOREIGN PATENT DOCUMENTS

| | | |
|---|---|---|
| AU | 2008200543 A1 | 8/2009 |
| CN | 100429805 C | 10/2008 |
| CN | 100429806 C | 10/2008 |
| CN | 102452293 A | 5/2012 |
| CN | 102802983 A | 11/2012 |
| CN | 103568820 A | 2/2014 |
| CN | 104010884 A | 8/2014 |
| CN | 106029407 A | 10/2016 |
| CN | 205645923 U | 10/2016 |
| CN | 106207029 A | 12/2016 |
| CN | 106410077 A | 2/2017 |
| DE | 4105246 A1 | 8/1992 |
| DE | 4129351 A1 | 5/1993 |
| DE | 4427322 A1 | 2/1996 |
| DE | 19534427 A1 | 3/1996 |
| DE | 4446257 A1 | 6/1996 |
| DE | 202005018897 U1 | 2/2006 |
| DE | 102004062932 A1 | 8/2006 |
| DE | 102007012893 A1 | 3/2008 |
| DE | 102007017019 A1 | 3/2008 |
| DE | 102007030542 A1 | 3/2008 |
| DE | 102006049269 A1 | 6/2008 |
| DE | 202008006698 U1 | 7/2008 |
| DE | 102007011026 A1 | 9/2008 |
| DE | 102007021293 A1 | 11/2008 |
| DE | 102007044526 A1 | 3/2009 |
| DE | 102007050103 A1 | 4/2009 |
| DE | 102007063187 B3 | 4/2009 |
| DE | 102008051786 A1 | 4/2009 |
| DE | 102007063194 A1 | 6/2009 |
| DE | 102008034880 A1 | 6/2009 |
| DE | 102007061562 A1 | 7/2009 |
| DE | 102008010813 A1 | 8/2009 |
| DE | 102008024007 A1 | 12/2009 |
| DE | 102008034695 A1 | 1/2010 |
| DE | 102008034700 A1 | 1/2010 |
| DE | 102008034856 A1 | 1/2010 |
| DE | 102008034860 A1 | 1/2010 |
| DE | 102008034863 A1 | 1/2010 |
| DE | 102008034873 A1 | 1/2010 |
| DE | 102008034889 A1 | 1/2010 |
| DE | 102008052284 A1 | 4/2010 |
| DE | 102008059953 A1 | 6/2010 |
| DE | 102008059964 A1 | 6/2010 |
| DE | 102008059966 A1 | 6/2010 |
| DE | 102008059967 A1 | 6/2010 |
| DE | 102008059969 A1 | 6/2010 |
| DE | 102008059971 A1 | 6/2010 |
| DE | 102008054968 A1 | 7/2010 |
| DE | 102010006514 A1 | 9/2010 |
| DE | 102009019384 A1 | 11/2010 |
| DE | 102009035488 A1 | 2/2011 |
| DE | 102009040598 A1 | 3/2011 |
| DE | 102010014484 A1 | 3/2011 |
| DE | 102009043635 A1 | 4/2011 |
| DE | 102010007414 A1 | 8/2011 |
| DE | 102010009063 A1 | 8/2011 |
| DE | 102010012992 A1 | 9/2011 |
| DE | 102010012996 A1 | 9/2011 |
| DE | 102010013025 A1 | 9/2011 |
| DE | 102010028728 A1 | 11/2011 |
| DE | 102011011698 A1 | 8/2012 |
| DE | 102011013182 A1 | 9/2012 |
| DE | 102011016526 A1 | 10/2012 |
| DE | 102011017459 A1 | 10/2012 |
| DE | 102011075820 A1 | 11/2012 |
| DE | 102011103990 A1 | 12/2012 |
| DE | 102011080053 A1 | 1/2013 |
| DE | 102011107007 A1 | 1/2013 |
| DE | 102011109309 A1 | 2/2013 |
| DE | 102011111537 A1 | 2/2013 |
| DE | 102011112598 A1 | 3/2013 |
| DE | 102011086049 A1 | 5/2013 |

(56) References Cited

FOREIGN PATENT DOCUMENTS

| | | |
|---|---|---|
| DE | 102011109011 A1 | 5/2013 |
| DE | 102011120010 A1 | 6/2013 |
| DE | 102012000622 A1 | 7/2013 |
| DE | 102012200350 A1 | 7/2013 |
| DE | 102012001596 A1 | 8/2013 |
| DE | 102012102657 A1 | 10/2013 |
| DE | 102012103149 A1 | 10/2013 |
| DE | 102013205215 A1 | 10/2013 |
| DE | 102013205323 A1 | 10/2013 |
| DE | 202013104224 U1 | 10/2013 |
| DE | 102012012897 A1 | 1/2014 |
| DE | 102012107548 A1 | 2/2014 |
| DE | 102012219301 A1 | 2/2014 |
| DE | 202012104339 U1 | 2/2014 |
| DE | 102012018057 A1 | 3/2014 |
| DE | 102013200562 A1 | 7/2014 |
| DE | 102013200726 A1 | 7/2014 |
| DE | 102013200786 A1 | 7/2014 |
| DE | 102013203102 A1 | 8/2014 |
| DE | 102013102501 A1 | 9/2014 |
| DE | 102013208996 A1 | 11/2014 |
| DE | 102013215082 A1 | 2/2015 |
| DE | 102013218674 A1 | 3/2015 |
| DE | 102014011609 A1 | 3/2015 |
| DE | 102014217188 A1 | 3/2015 |
| DE | 102013016797 A1 | 4/2015 |
| DE | 102013223357 A1 | 5/2015 |
| DE | 102014100334 A1 | 7/2015 |
| DE | 202015005208 U1 | 8/2015 |
| DE | 102014203715 A1 | 9/2015 |
| DE | 102014106949 A1 | 11/2015 |
| DE | 202014008335 U1 | 1/2016 |
| DE | 202014008336 U1 | 1/2016 |
| DE | 102014011727 A1 | 2/2016 |
| DE | 102014215164 A1 | 2/2016 |
| DE | 102014112596 A1 | 3/2016 |
| DE | 102014219644 A1 | 3/2016 |
| DE | 102014115051 A1 | 4/2016 |
| DE | 102014221167 A1 | 4/2016 |
| DE | 102014019696 A1 | 6/2016 |
| DE | 102014224545 A1 | 6/2016 |
| DE | 102015015504 A1 | 6/2016 |
| DE | 102015014337 A1 | 7/2016 |
| DE | 102015200636 A1 | 7/2016 |
| DE | 102015204216 A1 | 9/2016 |
| DE | 202016005333 U1 | 9/2016 |
| DE | 102015219558 A1 | 4/2017 |
| DE | 102015222171 A1 | 5/2017 |
| EP | 0705724 A2 | 4/1996 |
| EP | 0779668 A1 | 6/1997 |
| EP | 0780915 A1 | 6/1997 |
| EP | 1939028 A1 | 7/2008 |
| EP | 2298690 A1 | 3/2011 |
| EP | 2374646 A2 | 10/2011 |
| EP | 2388851 A1 | 11/2011 |
| EP | 2456003 A1 | 5/2012 |
| EP | 2467276 A1 | 6/2012 |
| EP | 2554420 A1 | 2/2013 |
| EP | 2562065 A1 | 2/2013 |
| EP | 2565958 A1 | 3/2013 |
| EP | 2581249 A1 | 4/2013 |
| EP | 2620997 A1 | 7/2013 |
| EP | 2626231 A2 | 8/2013 |
| EP | 2626232 A2 | 8/2013 |
| EP | 2626233 A2 | 8/2013 |
| EP | 2741343 A1 | 6/2014 |
| EP | 2758262 A1 | 7/2014 |
| EP | 2833436 A1 | 2/2015 |
| EP | 2913863 A1 | 9/2015 |
| EP | 2944493 A1 | 11/2015 |
| EP | 2990247 A1 | 3/2016 |
| EP | 3379598 A1 | 9/2018 |
| EP | 3382774 A1 | 10/2018 |
| FR | 2661281 A1 | 10/1991 |
| FR | 2705926 A1 | 12/1994 |
| FR | 2774044 A1 | 7/1999 |
| FR | 2782399 A1 | 2/2000 |
| FR | 2861441 A1 | 4/2005 |
| FR | 2948072 A1 | 1/2011 |
| FR | 2949096 A3 | 2/2011 |
| FR | 2959454 A1 | 11/2011 |
| FR | 2961960 A1 | 12/2011 |
| FR | 2962076 A1 | 1/2012 |
| FR | 2975230 A1 | 11/2012 |
| FR | 2976731 A1 | 12/2012 |
| FR | 2982566 A1 | 5/2013 |
| FR | 2986374 A1 | 8/2013 |
| FR | 2986744 A1 | 8/2013 |
| FR | 2986910 A1 | 8/2013 |
| FR | 2986911 A1 | 8/2013 |
| FR | 2987000 A1 | 8/2013 |
| FR | 2987001 A1 | 8/2013 |
| FR | 2988039 A1 | 9/2013 |
| FR | 2990386 A1 | 11/2013 |
| FR | 2993511 A1 | 1/2014 |
| FR | 2994340 A1 | 2/2014 |
| FR | 2996193 A1 | 4/2014 |
| FR | 2998715 A1 | 5/2014 |
| FR | 2999809 A1 | 6/2014 |
| FR | 3000002 A1 | 6/2014 |
| FR | 3002910 A1 | 9/2014 |
| FR | 3007209 A1 | 12/2014 |
| FR | 3014035 A1 | 6/2015 |
| FR | 3019688 A1 | 10/2015 |
| FR | 3022402 A1 | 12/2015 |
| FR | 3028456 A1 | 5/2016 |
| GB | 2081495 A | 2/1982 |
| GB | 2353151 A | 2/2001 |
| GB | 2443272 A | 4/2008 |
| GB | 2483272 A | 3/2012 |
| GB | 2516120 A | 1/2015 |
| JP | 05193370 | 3/1993 |
| JP | H05193366 A | 8/1993 |
| JP | H05201356 A | 8/1993 |
| JP | H08268083 A | 10/1996 |
| JP | H08276752 A | 10/1996 |
| JP | H1075504 A | 3/1998 |
| JP | H10109548 A | 4/1998 |
| JP | H10149805 A | 6/1998 |
| JP | 2774044 B2 | 7/1998 |
| JP | 2819927 B2 | 11/1998 |
| JP | H11178115 A | 7/1999 |
| JP | 2967711 B2 | 10/1999 |
| JP | 2000041303 A | 2/2000 |
| JP | 3085346 B2 | 9/2000 |
| JP | 3085346 B2 | 9/2000 |
| JP | 3199296 B2 | 8/2001 |
| JP | 3284850 B2 | 5/2002 |
| JP | 3284878 B2 | 5/2002 |
| JP | 3286634 B2 | 5/2002 |
| JP | 3489186 B2 | 1/2004 |
| JP | 2004142524 A | 5/2004 |
| JP | 2007331669 A | 12/2007 |
| JP | 2011006050 A | 1/2011 |
| JP | 2011049151 A | 3/2011 |
| JP | 2011152906 A | 8/2011 |
| JP | 2013133044 A | 7/2013 |
| KR | 19980035496 A | 8/1998 |
| KR | 20030024276 A | 3/2003 |
| KR | 20120030014 A | 3/2012 |
| KR | 20140007063 A | 1/2014 |
| KR | 101565980 B1 | 11/2015 |
| KR | 101565981 B1 | 11/2015 |
| KR | 20160001976 A | 1/2016 |
| KR | 20160055712 A | 5/2016 |
| KR | 20160087077 A | 7/2016 |
| KR | 101647825 B1 | 8/2016 |
| KR | 20160092902 A | 8/2016 |
| KR | 20160104867 A | 9/2016 |
| KR | 20160111231 A | 9/2016 |
| KR | 20160116383 A | 10/2016 |
| KR | 20170000325 A | 1/2017 |
| KR | 101704496 B1 | 2/2017 |
| KR | 20170052831 A | 5/2017 |

(56) References Cited

FOREIGN PATENT DOCUMENTS

| | | |
|---|---|---|
| KR | 20170062845 A | 6/2017 |
| KR | 20170065764 A | 6/2017 |
| KR | 20170065771 A | 6/2017 |
| KR | 20170065854 A | 6/2017 |
| KR | 20170070080 A | 6/2017 |
| KR | 1020170067240 A | 6/2017 |
| SE | 507909 C2 | 7/1998 |
| TW | 201425112 A | 7/2014 |
| TW | I467830 B | 1/2015 |
| TW | I482718 B | 5/2015 |
| WO | WO-0074964 A1 | 12/2000 |
| WO | WO-2006100005 A2 | 9/2006 |
| WO | WO-2006100006 A1 | 9/2006 |
| WO | WO-2008104356 A1 | 9/2008 |
| WO | WO-2008104358 A1 | 9/2008 |
| WO | WO-2008104376 A1 | 9/2008 |
| WO | WO-2008131935 A2 | 11/2008 |
| WO | WO-2009080151 A1 | 7/2009 |
| WO | WO-2009080166 A1 | 7/2009 |
| WO | WO-2009103462 A1 | 8/2009 |
| WO | WO-2010004192 A2 | 1/2010 |
| WO | WO-2010012337 A1 | 2/2010 |
| WO | WO-2010012338 A1 | 2/2010 |
| WO | WO-2010012342 A1 | 2/2010 |
| WO | WO-2010040520 A2 | 4/2010 |
| WO | WO-2010063365 A1 | 6/2010 |
| WO | WO-2010069713 A1 | 6/2010 |
| WO | WO-2010076053 A1 | 7/2010 |
| WO | WO-2010076055 A1 | 7/2010 |
| WO | WO-2010076452 A1 | 7/2010 |
| WO | WO-2011030041 A1 | 3/2011 |
| WO | WO-2011083980 A2 | 7/2011 |
| WO | WO-2011106851 A2 | 9/2011 |
| WO | WO-2011116801 A1 | 9/2011 |
| WO | WO-2011116959 A2 | 9/2011 |
| WO | WO-2011121757 A1 | 10/2011 |
| WO | WO-2011134815 A1 | 11/2011 |
| WO | WO-2011134828 A1 | 11/2011 |
| WO | WO-2012025710 A2 | 3/2012 |
| WO | WO-2012063025 A2 | 5/2012 |
| WO | WO-2012065853 A1 | 5/2012 |
| WO | WO-2012065855 A1 | 5/2012 |
| WO | WO-2012069349 A1 | 5/2012 |
| WO | WO-2012084132 A2 | 6/2012 |
| WO | WO-2012093233 A1 | 7/2012 |
| WO | WO-2012097514 A1 | 7/2012 |
| WO | WO-2012114040 A1 | 8/2012 |
| WO | WO-2012116608 A1 | 9/2012 |
| WO | WO-2012119424 A1 | 9/2012 |
| WO | WO-2012163504 A2 | 12/2012 |
| WO | WO-2013020707 A2 | 2/2013 |
| WO | WO-2013027982 A2 | 2/2013 |
| WO | WO-2013042628 A1 | 3/2013 |
| WO | WO-2013080008 A2 | 6/2013 |
| WO | WO-2013188680 A1 | 12/2013 |
| WO | WO-2014114511 A1 | 7/2014 |
| WO | WO-2014140412 A1 | 9/2014 |
| WO | WO-2014140463 A1 | 9/2014 |
| WO | WO-2014183995 A1 | 11/2014 |
| WO | WO-2014191651 A2 | 12/2014 |
| WO | WO-2015018658 A1 | 2/2015 |
| WO | WO-2015043869 A1 | 4/2015 |
| WO | WO-2015149660 A1 | 10/2015 |
| WO | WO-2016029084 A1 | 2/2016 |
| WO | WO-2016046144 A1 | 3/2016 |
| WO | WO-2016046145 A1 | 3/2016 |
| WO | WO-2016046146 A1 | 3/2016 |
| WO | WO-2016046147 A1 | 3/2016 |
| WO | WO-2016072822 A1 | 5/2016 |
| WO | WO-2016086274 A1 | 6/2016 |
| WO | WO-2016106658 A1 | 7/2016 |
| WO | WO-2016132280 A1 | 8/2016 |
| WO | WO-2016203130 A1 | 12/2016 |
| WO | WO-2017025592 A1 | 2/2017 |
| WO | WO-2017032571 A1 | 3/2017 |
| WO | WO-2017060608 A1 | 4/2017 |
| WO | WO-2017084938 A1 | 5/2017 |
| WO | WO-2017103449 A1 | 6/2017 |
| WO | WO-2018033880 A2 | 2/2018 |
| WO | WO-2018065554 A1 | 4/2018 |
| WO | WO-2018149762 A1 | 8/2018 |
| WO | WO-2018213475 A1 | 11/2018 |
| WO | WO-2019055658 A2 | 3/2019 |
| WO | WO-2019-071013 A1 | 4/2019 |

OTHER PUBLICATIONS

International Searching Authority (KR), International Search Report and Written Opinion for International Application No. PCT/IB2017/055002, dated Jul. 19, 2018.

International Searhcing Authority, International Search Report and Written Opinion for Application No. PCT/IB2018/050066, dated Apr. 26, 2018.

Korean Intellectual Property Office (ISA), International Search Report and Written Opinion for International Application No. PCT/US2018/033009, dated Sep. 11, 2018.

Korean Intellectual Property Office (ISA), International Search Report and Written Opinion for International Application No. PCT/US2018/050889, dated Mar. 21, 2019.

Korean Intellectual Propery Office (ISA), International Search Report and Written Opinion for International Application No. PCT/US2018/054423, dated Jan. 28, 2019.

HybridCars "2017 Chevy Bolt Battery Cooling and Gearbox Details", George S. Bower and Keith Ritter, 15 pages, Jan. 18, 2016.

Chevrolet Pressroom, "Drive Unit and Battery at the Heart of Chevrolet Bolt EV, Engineers focus on careful balance of range and performance", 9 pages, Jan. 11, 2016.

U.S. Patent and Trademark Office Non-Final Office Action for U.S. Appl. No. 15/980,249 dated Mar. 20, 2020.

VEHICLE BATTERY TRAY HAVING TUB-BASED COMPONENT

CROSS-REFERENCE TO RELATED APPLICATIONS

This application is a Continuation Application of U.S. nonprovisional patent application Ser. No. 15/980,249, filed May 15, 2018, which claims benefit and priority under 35 U.S.C. § 119(e) of U.S. provisional application Ser. No. 62/506,950, filed May 16, 2017 and U.S. provisional application Ser. No. 62/643,345, filed Mar. 15, 2018, which are hereby incorporated herein by reference in their entireties.

TECHNICAL FIELD

The present disclosure generally relates to vehicle battery support trays and structures, and more particularly to structural components and protective enclosures for concealing and protecting vehicle electronic components and batteries, such as battery packs or modules or the like for electric and hybrid electric vehicles.

BACKGROUND

Electric and hybrid electric vehicles are typically designed to locate and package battery modules on the vehicle in a manner that protects the batteries from damage when driving in various climates and environments, and also that protects the batteries from different types of impacts. It is also fairly common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle.

SUMMARY

The present disclosure provides a battery tray for an electric vehicle, such as an all-electric or hybrid electric vehicle, where the battery tray has a tub component that may provide a perimeter wall around a battery containment area of the battery tray. The tub component may be formed or molded to provide an interior surface of the battery containment area that is sealed and resistant to leaks or penetration of gases or liquids, so to protect the batteries or battery modules contained in the battery tray. To support the weight of the batteries or battery modules and to provide structure configured for impact energy management, among other functions, the tub component may further include a separate support structure and may also or alternatively include integral structural features that are formed as a single piece with the tub component. Such integral structural features of the tub component may reduce the number of overall components used to make the battery tray and the associated connection and attachment points of such additional components that can be a risk of potential leaks or penetrations.

According to one aspect of the present disclosure, a battery tray for an electric vehicle includes a tub component that has a floor portion and a perimeter wall portion that integrally extends upward around a peripheral edge of the floor portion to border a battery containment area of the tub component. A support structure may have an elongated member coupled at an exterior side of each of opposing longitudinal sections of the perimeter wall portion of the tub component. Also, the tub component may include a plurality of cross member portions that integrally interconnect with the floor portion and the perimeter wall portion so as to span laterally across the battery containment area to divide the battery containment area into separate compartments.

According to another aspect of the present disclosure, a battery tray for an electric vehicle includes a tub component that has a floor portion and a perimeter wall portion that integrally extends upward around a peripheral edge of the floor portion to border a battery containment area of the tub component. The tub component may also include a plurality of cross member portions that each integrally interconnect with the floor portion and the perimeter wall portion so as to sub-divide the battery containment area into separate battery compartments. At least one of the cross member portions of the tub component may include a forward wall section and a rearward wall section, which each provide an interior surface of adjacent compartments of the battery containment area.

According to yet another aspect of the present disclosure, a battery tray for an electric vehicle includes a tub component that has a floor portion and a perimeter wall portion that integrally extends upward around a peripheral edge of the floor portion to border a battery containment area. The tub component may include a plurality of cross member portions that integrally interconnect with the floor portion and opposing sides of the perimeter wall portion. The battery tray may also include a support structure that has an elongated member coupled at an exterior side of each of opposing longitudinal sections of the perimeter wall portion of the tub component. Further, the perimeter wall portion of the tub component have a flange that protrudes outward at the opposing longitudinal sections of the perimeter wall portion. A cover may attach at the flange of the tub component to enclose an upper opening of the battery containment area.

The battery tray of the present disclosure may provide a tub component that lines at least a portion of the interior of a battery containment area for protecting battery modules held in the battery tray. Such a tub component may provide structural support the battery tray, such that a support structure or frame may be undersize or lightened or eliminated to allow the tub component to provide a portion or fraction of the overall desired load support capability of the battery tray. The containment area of the battery tray may also be sealed with a cover around an upper edge of the tub component to enclose the battery modules in the battery tray, such as with a cover that attaches at an upper portion or flange of the tub component.

These and other objects, advantages, purposes, and features of the present disclosure will become apparent upon review of the following specification in conjunction with the drawings.

DETAILED DESCRIPTION

Figure 1:
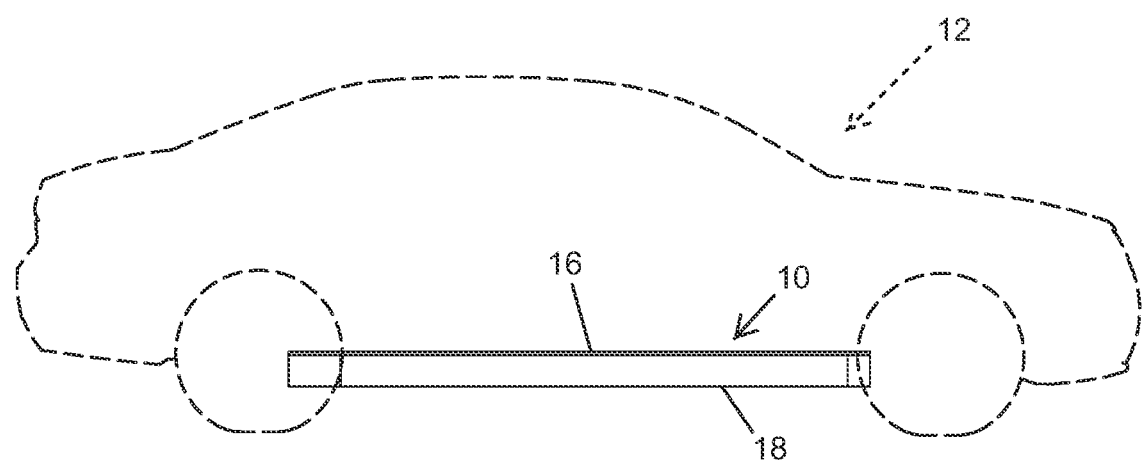
FIG. 1 is a side elevation view of a battery tray at a mounting location on a vehicle in accordance with the present disclosure.

Referring now to the drawings and the illustrative embodiments depicted therein, a vehicle battery tray 10 may be provided for supporting and protecting batteries, such as battery packs or modules or the like, for an electric vehicle 12, such as shown in FIG. 1. The electric vehicle may be an all-electric or a hybrid electric vehicle or vehicle that is otherwise propelled or operated using stored electricity. The battery tray 10 for housing the batteries may be attached or mounted at or near the lower frame or rocker rails of the vehicle 12, so as to locate the contained batteries or battery modules 14 (FIG. 3) generally in a central location on the vehicle 12, away from probable impact locations and also in a location that evenly distributes the weight of the batteries 14 and provides the vehicle with a relatively low center of gravity. The battery tray 10 may span below the occupant compartment at a lower portion of the vehicle 12, such as shown in FIG. 1 with a generally thin profile, so as to accommodate various vehicle body types and designs. The profile or thickness of the battery tray 10 may be defined between the upper surface 16 and the lower surface 18 of the battery tray 10. It is contemplated that the battery tray 10 may be disengaged or detached from the lower portion of the vehicle 12, such as for replacing or performing maintenance on the battery modules 14 or related electrical components.

Figure 2:
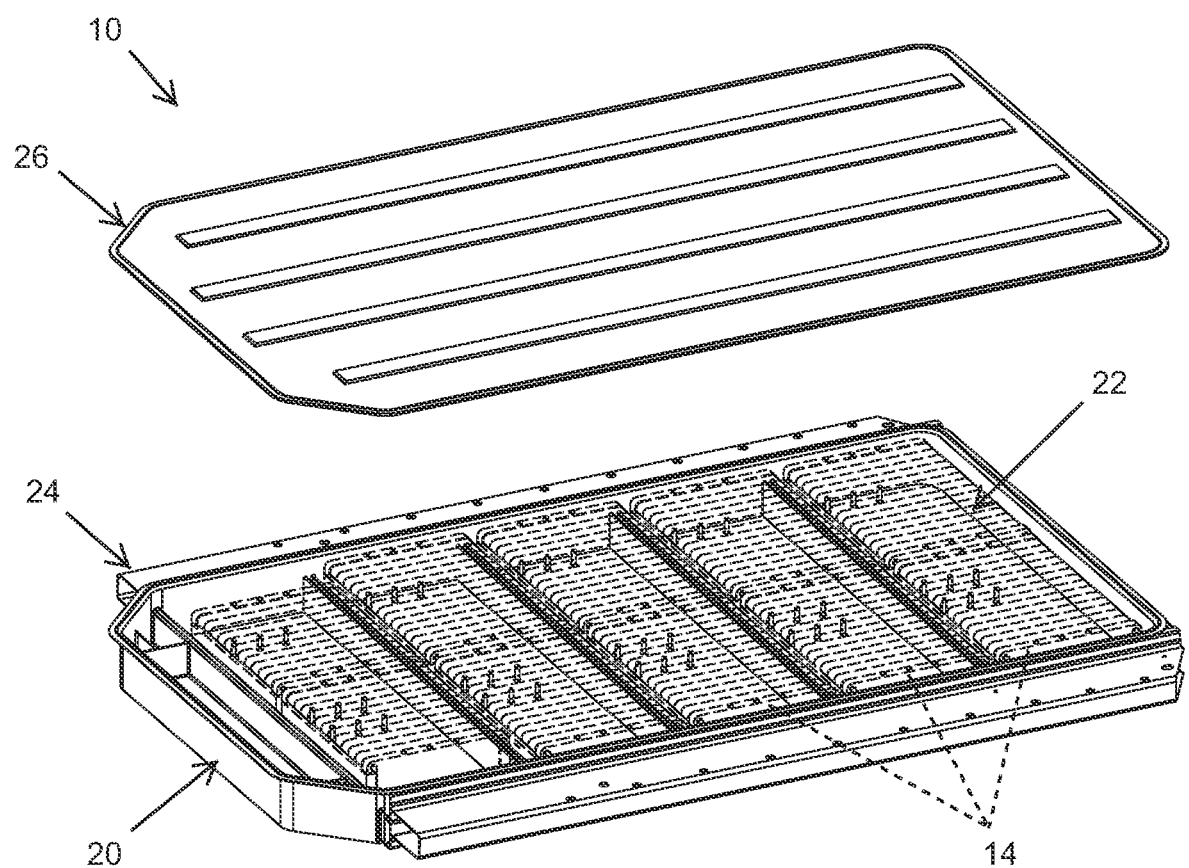
FIG. 2 is an upper perspective view of a battery tray having a cover exploded away to show battery modules in the battery containment area of the battery tray.

A battery tray may have various exterior dimensional requirements to accommodate a vehicle platform or frame design, such that it may be desirable to maximize the usable volume of the battery containment area within the battery tray, while cost effectively maintaining the desired impact protection and resistance to water, gases, and debris penetrating into the sealed environment around the battery modules. The battery tray 10 of the present disclosure may provide a tub component 20, such as shown in FIG. 2, which may line or otherwise define at least a portion of the interior surface or structure of the battery containment area 22 that is occupied by the battery modules 14 and other conceivable items or components, such as electrical cables, coolant lines, cold plates, other battery cooling components, fire suppression system components, or the like. The battery tray 10 may also include a support structure 24 that is coupled at and supporting the tub component 20, such as a beam or member of a support structure 24 being attached at an exterior portion of a tub component 20. The tub component 20 may also provide structural support to the battery tray 10, such that a support structure 24 or frame may be undersize, lightened, or partially or completely eliminated to allow the tub component to provide a portion or fraction of the overall desired load support capability of the battery tray 10. The tub component 20 of the battery tray 10 may also be sealed with a cover 26 around an upper edge of the tub component 20 to at least partially enclose the battery modules 14 in the battery tray 10, as further described below.

Figure 3:
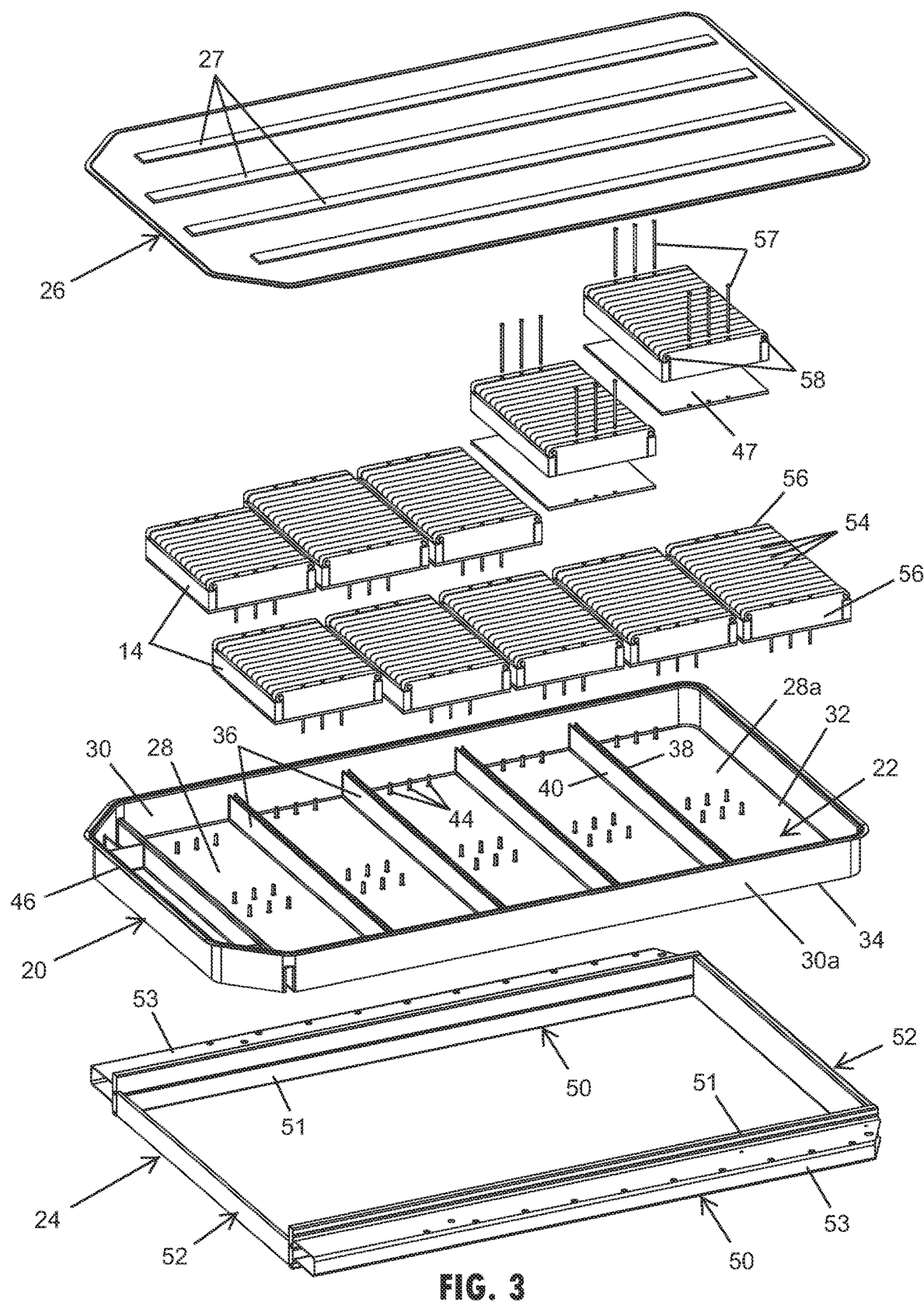
FIG. 3 is an exploded, upper perspective view of the battery tray shown in FIG. 2, showing the battery modules exploded from the tub component of the battery tray.
Figure 4:
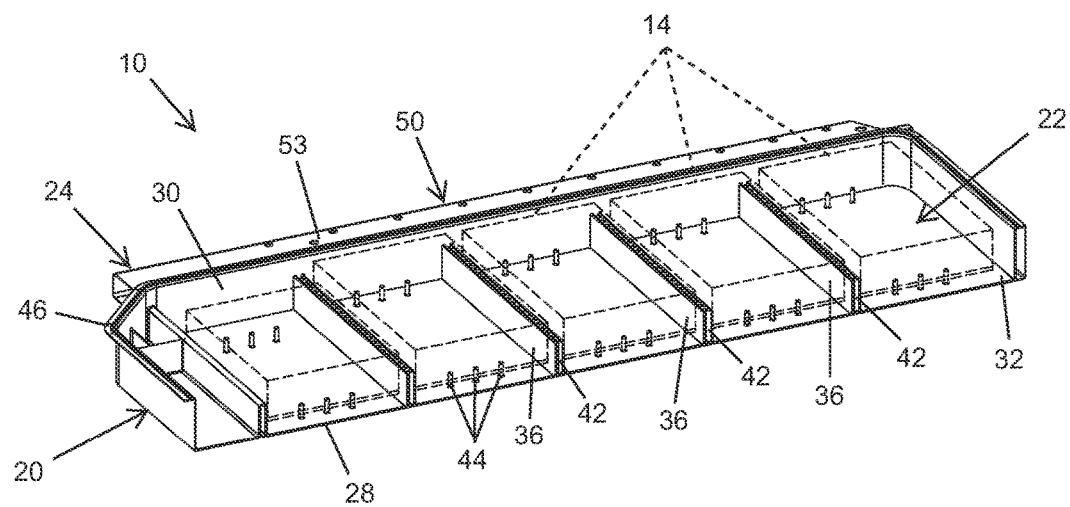
FIG. 4 is a cross-sectional, upper perspective view of the battery tray shown in FIG. 2 with the cross section taken centrally along a length of the battery tray.
Figure 4A:
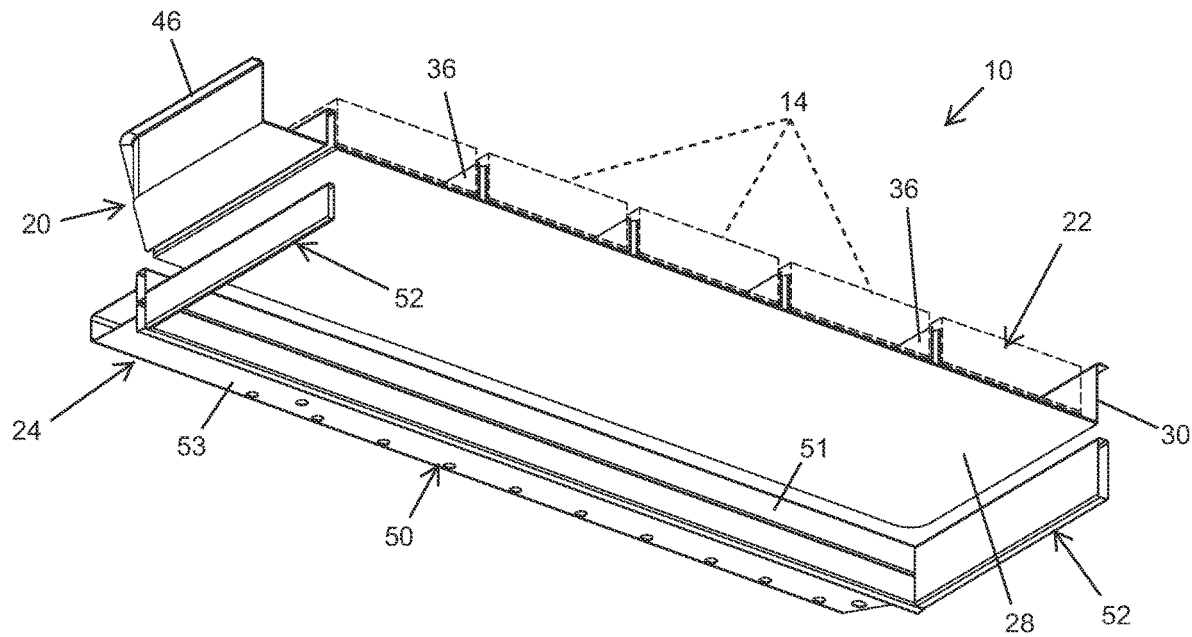
FIG. 4A is an exploded, lower perspective view of the section of the battery tray shown in FIG. 4, showing the tub component exploded away from the support structure.
Figure 5:
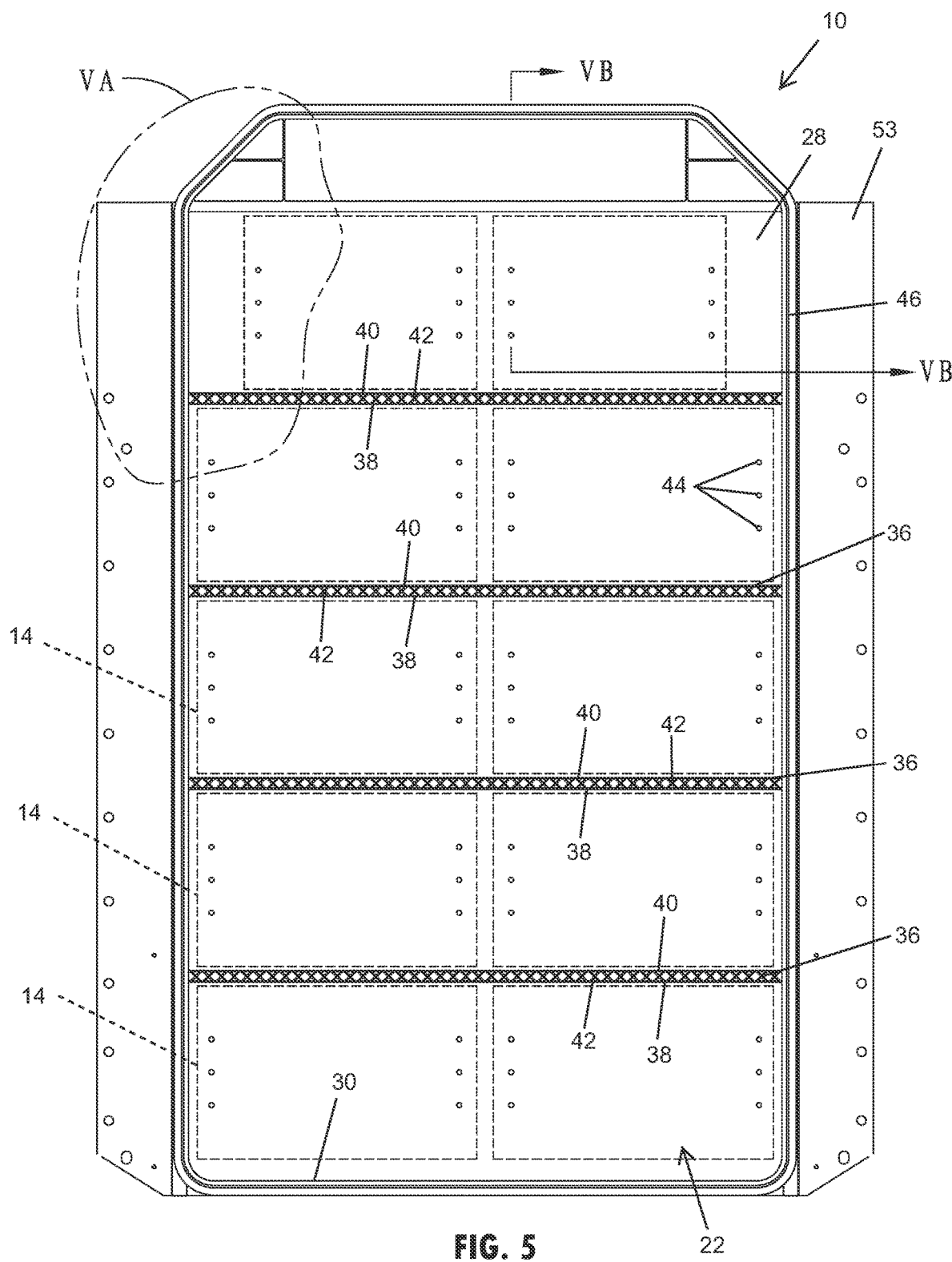
FIG. 5 is a top view of the battery tray shown in FIG. 2.

The tub component 20 of the battery tray 10, such as shown in FIGS. 2-5, may include a floor portion 28 and a perimeter wall portion 30 that integrally extends upward around a peripheral edge 32 of the floor portion 28 to border the battery containment area 22. The floor portion 28 and the perimeter wall portion 30 may together form a solid and uninterrupted interior surface. The floor portion 28 and the perimeter wall portion 30 may each include sections that are substantially planar, such as the planar panel section 28a of the floor portion 28 and the planar longitudinal sections 30a of perimeter wall portion 30 shown in FIG. 3. Such planar sections may be generally perpendicular relative to each other, such that the angular transition between the floor portion 28 and the perimeter wall portion 30 may be generally ninety degrees, such as with a sharp corner angle or a curved corner transition 34 as shown in FIG. 5C. It is understood that the shape of the floor and peripheral wall portions and angle of the transition from a floor portion to a perimeter wall portion may vary in additional embodiments of the battery tray, such as depending on the battery tray design and capacity. The tub component 20 may be formed with various materials, such as the floor portion 28 and the perimeter wall portion 30 of the tub component being a single integral piece formed from a sheet of the group consisting of a sheet molding compound, an aluminum alloy, and a steel alloy.

Referring again to the structural support of the battery tray 10, the tub component 20 may include integral structural features that are formed as a single piece with the tub component, such as to support the weight of the batteries or battery modules and to provide structure configured for impact energy management, among other functions. For example, as shown in FIG. 3, the tub component 20 includes cross member portions 36 that each integrally interconnecting with the floor portion 28 and opposing sides of the perimeter wall portion 30. The cross member portions 36 may span laterally across the battery containment area 22 to divide the battery containment area into separate compartments, such as shown in FIG. 3. The tub component 20 may thus be configured to direct load paths along the cross member portions 30 for transferring lateral impact forces through the battery containment area 22, while generally limiting disruption to the battery modules 14 or other electronic equipment supported therein. The cross member portions 36 of the tub component 20 may each extend laterally in parallel alignment with each other and at a longitudinal spacing from each other that is configured or sized for the defined compartment to contain at least one battery module 14. It is also contemplated that in additional embodiments of the battery tray that the cross member portions of the tub component may have various alternative shapers or configurations, such as extending through the battery containment area in a longitudinal or diagonal orientation relative to the battery tray and vehicle or being separated at a differently configured spacing.

The interior surface of the tub component 20 may provide or otherwise define lower and side interior surfaces of the battery containment area 22. Also, the cross member portions 36 may continuously extend upward from the floor portion 28, such that the interior surface of the separate compartments of the tub component 20 may have generally solid and uninterrupted interior surfaces for having a sealed interior volume of the batter containment area 22. As shown in FIGS. 3-5, the cross member portions 36 of the tub component 20 may also include a forward wall 38 and a rearward wall 40 that each provide an interior surface of adjacent compartments of the battery containment area 22. The forward and rearward wall sections 38, 40 may integrally interconnect with the floor portion 28 and wall portion 30 to form a solid and uninterrupted interior surface. Thus, the forward and rearward wall sections 38, 40 may subdivide the battery containment area 22 into the separate compartments or chambers to provide longitudinal separation between battery modules, such as to prevent cross-contamination of the battery modules and to insulate the batter modules form each other.

Figure 5A:
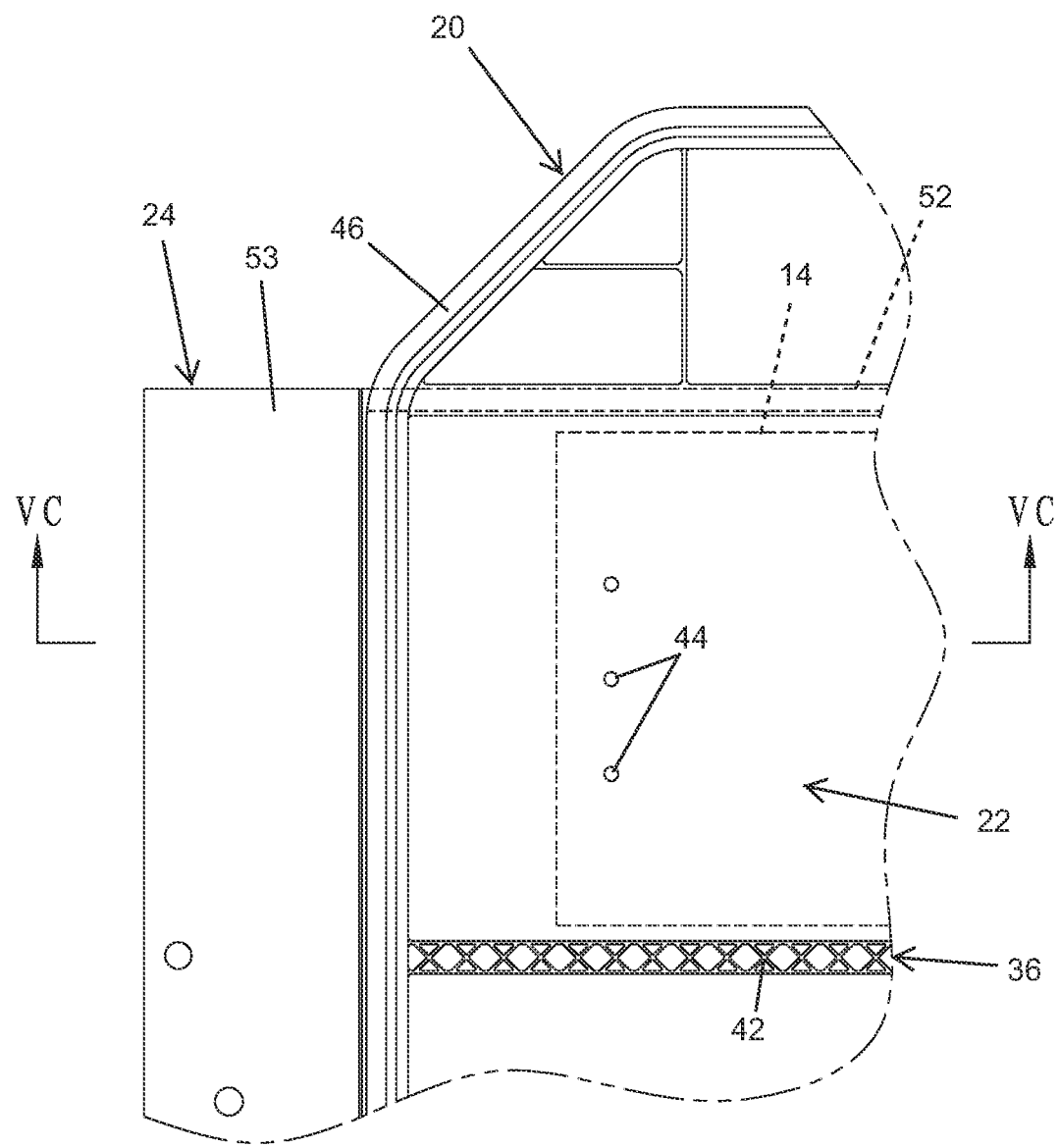
FIG. 5A is a top view of a portion the battery tray shown in FIG. 5, taken at the area marked as VA in FIG. 5.

Moreover, the cross member portions 36 may include stiffening features 42 that integrally interconnect between the forward and rearward wall sections 38, 40, such as shown in FIGS. 5 and 5A. Such stiffening features 42 may integrally extend upward from the floor portion 28 of the tub component 20, such that the floor portion 28 of the tub component 20 may extend between the forward and rearward wall sections 38, 40 of the cross member portions 36. Also, the stiffening features 42, such as shown in FIG. 4, may integrally extend upward in a continuous manner along a height of the forward and rearward wall sections 38, 40. The stiffening features 42, such as those shown in FIG. 5, may include an x-shape when viewed from above, such that the stiffening features 42 may extend diagonally between the forward and rearward wall sections 38, 40. However, it is also contemplated that the stiffening features in additional embodiments may include additional or alternative shapes and configurations to provide the desired mass and support along the cross member sections. Also, additional embodiments of the tub component may include at least one cross member portion that integrally interconnects with and extends upward form the floor portion, yet lack a section of the floor portion between the forward and rearward wall sections of the respective cross member portion.

Figure 8:
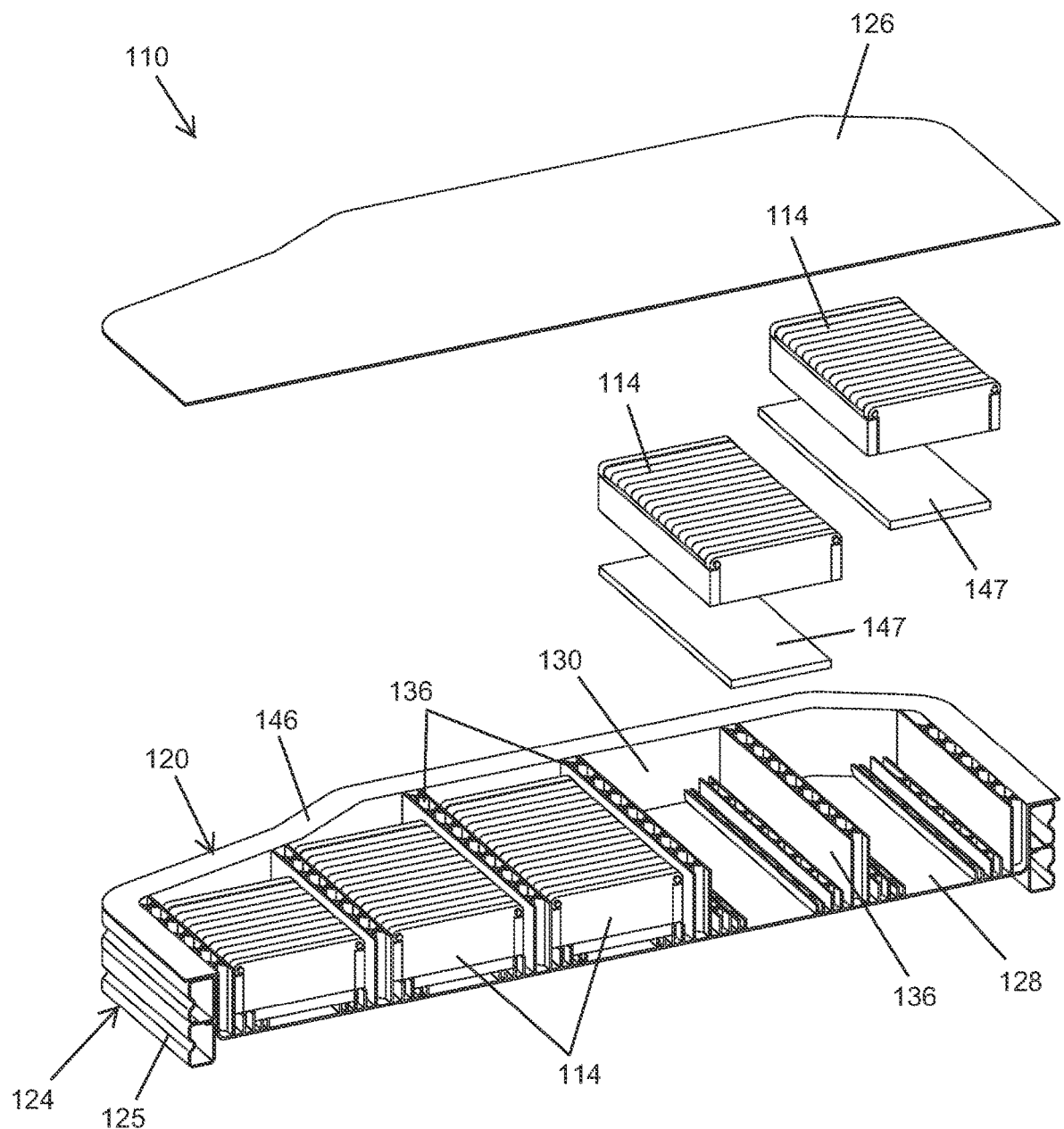
FIG. 8 is an exploded, cross-sectional, upper perspective view of the battery tray shown in FIG. 6 with the cross section taken centrally along a length of the battery tray.
Figure 8A:
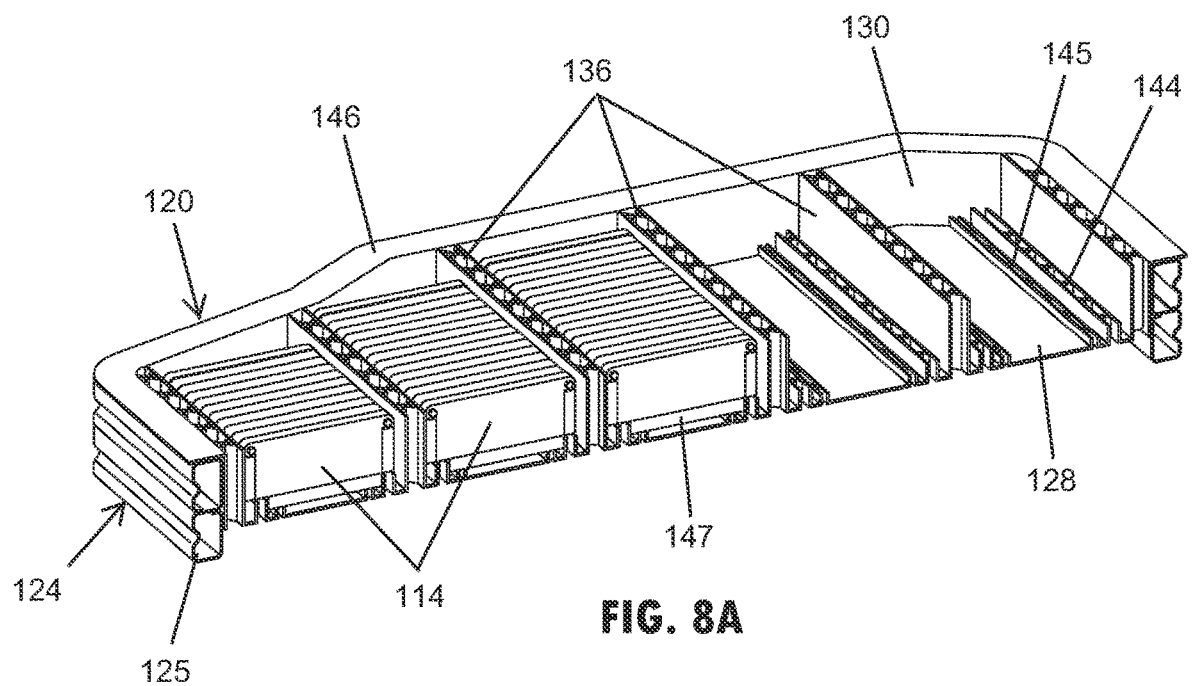
FIG. 8A is a cross-sectional, upper perspective view of the battery tray shown in FIG. 8, showing some of the battery modules removed from the tub component of the battery tray.

The tub component may also include other integral features in addition to or in the alternative to integral structural features, such as battery supports, cold plate supports, and other conceivable integral features that can be used to support or secure the battery modules or other related components in the battery tray. As shown in FIGS. 3 and 4, the tub component 20 includes integral battery supports comprising support posts 44 that integrally extend upward from the floor portion 24 of the tub component 20 adjacent to and generally parallel with the cross member portions 30. The battery supports 38 may elevate the lower surface of the battery modules 14 away from the floor portion 24 of the tub component for air circulation and to provide an intrusion distance that prevents damage to the battery modules 14 from impacts to the bottom or lower surface of the battery tray 10. The battery supports 38 may also have a height that is configured to support a cold plate or cooling element 47, such as a thermoelectric component or a liquid cooled component, against or in thermal engagement with the lower surface of the battery module 14, such as shown in FIG. 8.

The battery supports in additional embodiments may have various structural designs to support the battery modules or other items. Again, the tub component 20 may be formed with various materials, whereby the floor portion 28, the perimeter wall portion 30, the cross member portions 36, the support posts 44, and other features may be formed as a single integral piece from a sheet molding compound or like composite materials. With the sheet molding compound, a resin and composite material may be pressed into a die to form the desired features of the tub component, such that the integral structural features of the tub component may be formed in the direction of the press, such as in the vertical direction. It is also contemplated that the tub component may include carbon fibers, such as at a lower layer of the of the tub insert to provide additional stiffness and intrusion resistance. Moreover, additional embodiments of the tub component may include a polymeric material, such as an injection molded plastic, or stamped or formed metal.

Figure 5B:
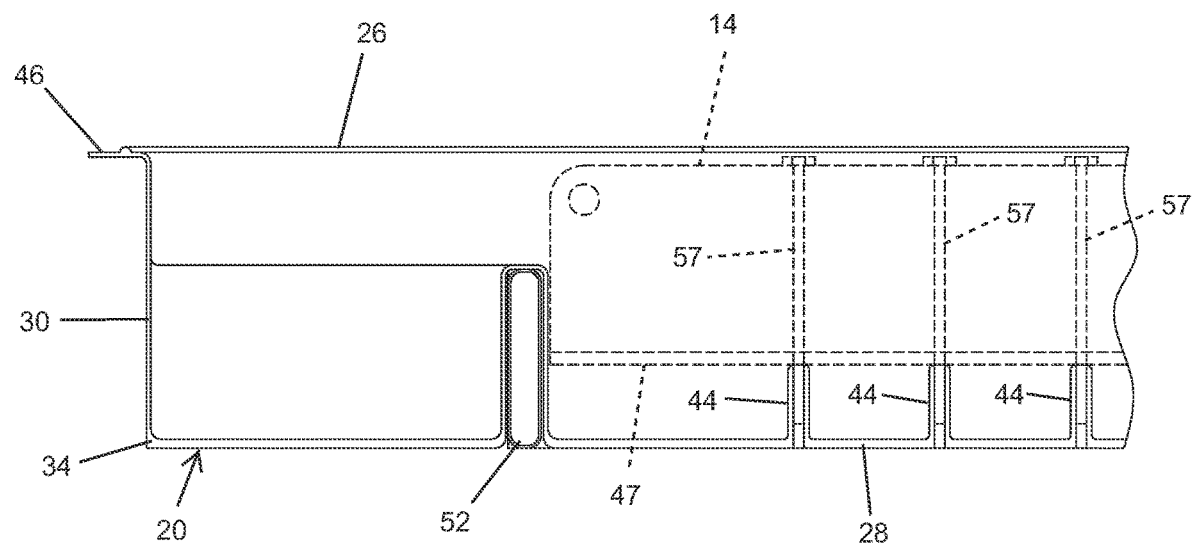
FIG. 5B is a cross-sectional view of the battery tray shown in FIG. 5 with the cross section taken at line VB-VB shown in FIG. 5.
Figure 5C:
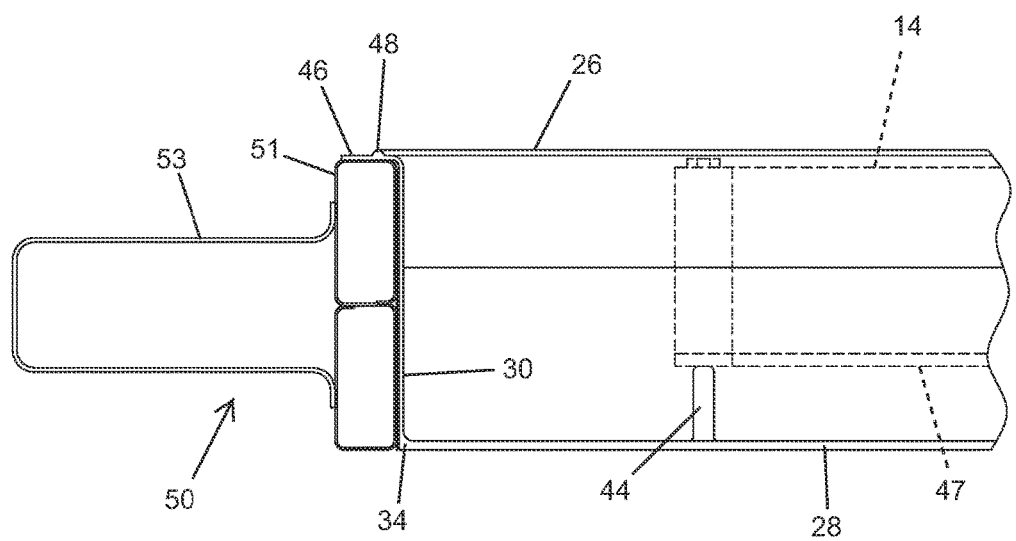
FIG. 5C is a cross-sectional view of the battery tray shown in FIG. 5 with the cross section taken at line VC-VC shown in FIG. 5A.

The battery modules 14 mounted in the battery tray 10 may have various configurations and designs. As shown in FIG. 3, the battery module 14 may retain a series of battery cells or plates or pouches 54 by securing the cells or pouches 54 between end castings 56, where a rod 58 may extend generally horizontally between the end castings 56 of each battery module 14 and through the associated cells or pouches 54. Thus, the rods 58 may be fastened at the end castings 56 to retain the cells or plates or pouches 54 together with the end castings 56 of the respective battery module 14. The illustrated battery modules 14 each include two rods 58 extending through an upper corner portion of the end castings 56 in general alignment with the lateral span of the cross member portions 36. Further, the end castings 56 may be secured to the tub component 20 with fasteners 57 that extend vertically to engage coaxially within the support posts 44, such as shown in FIGS. 3 and 5B. The battery compartments separated by the cross member portions 36 of the tub component 20 may each contain two battery modules of generally equal capacity, such as shown in FIG. 5. However, more or fewer battery modules may be provided in the battery containment area of the tub, such as more or fewer modules in each compartment of the tub component. It is also contemplated that an alternative arrangement and nesting configuration may be provided for the battery modules.

With further reference to FIGS. 3 and 4, the perimeter wall portion 30 of the tub component 20 may include a flange 46 that protrudes outward away from the battery containment area 22 at the opposing sides of the perimeter wall portion 30. Thus, at the opposing sides of the perimeter wall portion 30 of the tub component 20, the flange 46 may engage an upper surface of a longitudinal portion of a support structure 24. As shown in FIG. 3, the flange 46 protrudes outward at the upper edge of the perimeter wall portion 30 and extends around the entire perimeter of the tub component 20. However, it is contemplated that the flange in additional embodiments may protrude from an alternative vertical location at the perimeter wall and may be provided at a select portion or portions of the perimeter wall portion so as to provide the desired engagement with the support structure. The flange 46 may be used to provide a consistent upper surface for a cover 26 to attach over the battery containment area 22 of the tub component. As shown in FIG. 5C, the flange 46 of the tub component 20 may include a sealing element, such as a channel or a protrusion 48, disposed around the upper surface of the flange 46 to mate with a complementary portion of the cover 26, such as a complementary sealing channel or protrusion. Also, the sealing element may include a gasket, a sealing adhesive, or like seal to provide a generally sealed cover connection that prevents gases, liquids, and debris from entering or exiting the battery containment area through an upper opening of tub component.

The cover 26 may seal and enclose at least a portion of the battery containment area provided in the tub component. As shown in FIG. 3, the cover 26 include a panel with a stiffening channels 27 that extend longitudinally along the cover 26. It is also conceivable that the cover 26 may be separate panel sections that are adapted for the respective battery tray, such as with raised or recessed areas that respectively increase or decrease the effective container volume of the battery tray 10. The cover 26 may be attached over the tub component in a manner that is relatively easy to remove and that maintains the sealed battery containment area, such as via bolts or screws or other removable fasteners that may compress a gasket or other sealing member between the cover 26 and the top surface of the peripheral wall portions of the tub component 20. This allows the cover 26 to be removable for accesses the battery modules 14 or other electric components housed in the battery containment area 22 for replacement, maintenance, or inspection or the like. It is also conceivable that the cover in additional embodiments may alternatively have at least a section that is an integral portion of the floor of the vehicle occupant cabin, such that the cover panel may be secured to the upper opening of the battery tray simultaneously with attaching it to the vehicle.

Figure 6:
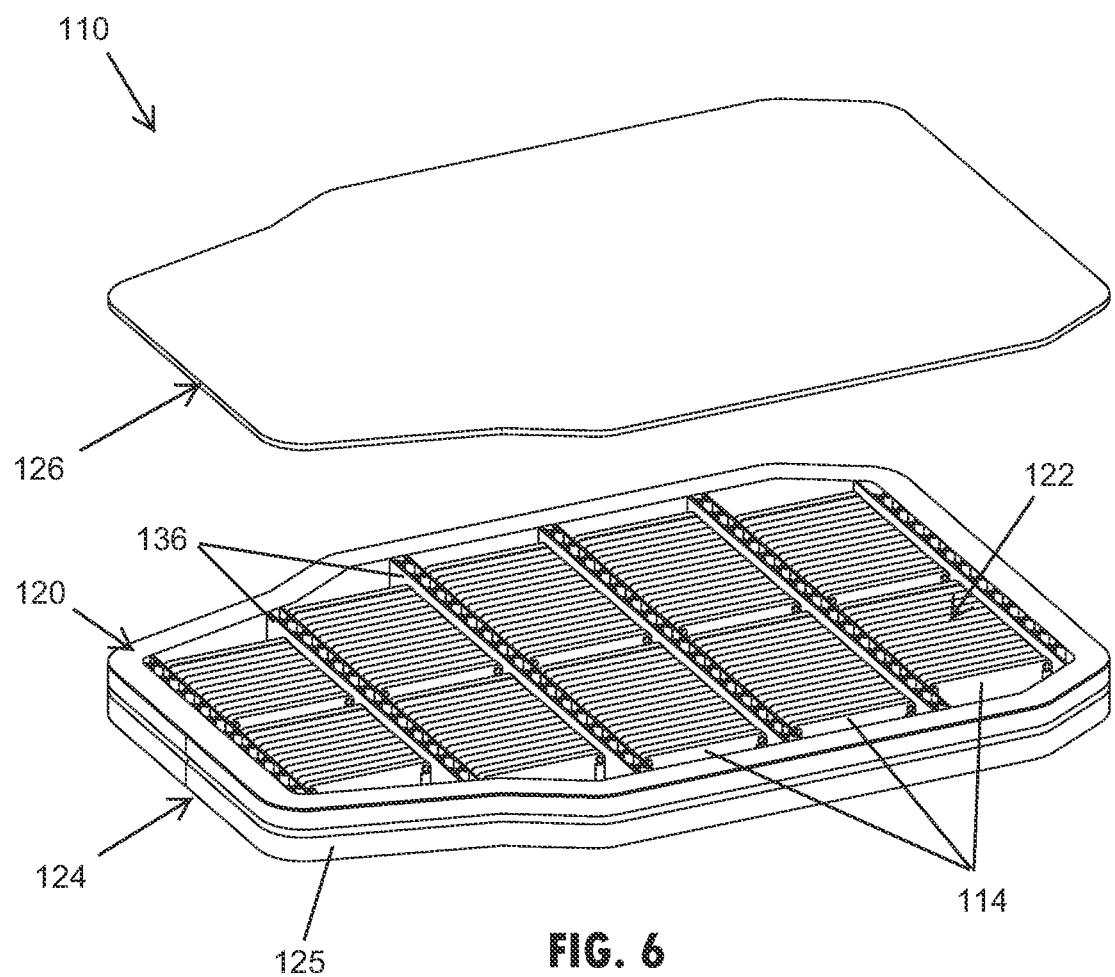
FIG. 6 is an upper perspective view of an additional embodiment of a battery tray having a cover exploded away to show the battery modules in the battery containment area.

As shown in FIGS. 2-4A, the battery tray 10 may have a support frame or structure 24 that is attached at an exterior portion of a tub component 20, such as to supplement or compliment the structure of the tub component 20. The support structure 24 may include an elongated member, such as a longitudinal section or member 50, such as shown in FIG. 2, which is coupled at an exterior side of each of the longitudinal sections 30a of the perimeter wall portion 30 of the tub component 20. The support structure 24 may also or alternatively include one or more laterally oriented reinforcement structures, such as a lateral section or member 52, such as shown in FIG. 3. The lateral members 52 may attached at an end portion of the longitudinal members 50, such as to form a generally rectangular frame as shown in FIG. 3, which is sized to engage or attach at the front and rear ends of the perimeter wall portion 30 of the tub component 20. As further shown in FIG. 3, the longitudinal and lateral members 50, 52 of the support structure 24 may be separate members or beams that may be attached together or are separately attached to the vehicle frame. It is also contemplated that the support structure 24 may include one or more integral pieces, such as a single beam wrapped around the tub component, such as shown in FIG. 6.

The illustrated support structure 24 shown in FIGS. 2-5 may be provided as a rigid metal or composite structure, such as with elongated beams that are attached together via welding, adhesive, fasteners, and/or other attachment means. The longitudinal and lateral members 50, 52 shown in FIGS. 2-5 are separate metal beams that are attached at ends thereof to form a generally rectangular frame. The members or beams of the support structure may have one or more hollow interior areas, such two hollow areas arranged with one disposed over the other, which is also referred to as a mono-leg beam. With respect to the embodiment shown in FIGS. 3 and 5C, the longitudinal members 50 of the support structure 24 may be formed from a metal sheet, such as via roll forming, to provide adjacent, vertically stacked, tubes 51 that include a common center wall disposed in a generally horizontal orientation. In forming the metal sheet into the longitudinal members, outer portions of the metal sheet that extend from opposing sides of the common center wall are bent generally simultaneously in the same rotational direction to attach respectively at opposing ends of the common center wall. With further reference to the embodiment shown in FIGS. 3 and 5C, an outboard extension beam 53 is attached along an outer surface of the tubular beam 51, where the outboard extension beam 53 has a hat or U shape, although various other shapes are contemplated such as a tube. The outboard extension beam 53 of the longitudinal members 50 may be provided to use as an attachment structure and interface with the vehicle, such as to attach at the rocker rails or similar structure of the vehicle frame.

With respect to the lateral members 52 of the support structure 24 shown in FIGS. 3 and 5B, the lateral members 52 may be formed from a metal sheet, such as via roll forming, to provide a single tubular beam. However, it is contemplated that the lateral members in additional embodiments may be provided with various alternative beam shapes, such as a mono-leg beam. The metal sheet or sheets that may form the beams or members of the support structure 24 may comprise a high strength steel, such as a cold worked martensitic steel, so as to be configured for absorbing and generally resisting intrusion from lateral impact forces to the battery tray 10. However, the support structure may alternatively be alternatively formed with aluminum, or other metals or materials or combinations thereof. Thus, it is contemplated that the cross-sectional shape of additional embodiments of the support structure may be altered from the illustrated embodiment, such as to be formed via pultrusion, extrusion, or the like.

To engage the tub component 20 at or within the support structure 24, the flange 46 of the tub component 20 may engage an upper surface of a longitudinal member 50 of the support structure 24, such that the longitudinal sections 30a of the tub component 20 may engage the inside vertical surfaces of the longitudinal members 50 of the support structure 24. Also, at least one of the lateral members 52 may be engaged by the flange 46 of the tub component 20, such as the forward lateral member 52 shown in FIG. 3. Thus, the cover 26 attachment at the flange 46 of the tub component 20 may allow the flange 46 to be sandwiched between the edge portion of the cover and the support structure. The tub component 20 may also include a downward facing channel 60, such as shown in FIG. 5B where a lateral member 52 may engage the downward facing channel 60 to vertically support the tub component 20. With a section of the support structure engaged with a downward facing channel of the tub component, two of the separate compartments may be disposed at opposing longitudinal sides of one of the engaged portion of the support structure.

Referring now to FIGS. 6-10, an additional embodiment of the battery tray 110 may also include a support structure 124 that is coupled at and supporting the tub component 120. The support structure 124 shown in FIG. 6 includes a single support beam 125 that is bent at the corners of the tub component 120 to surround the perimeter wall portion 130 (FIG. 8) of the tub component 120. The support beam 125 thus includes longitudinal sections 150 that couple at exterior sides of each of the longitudinal sections 150 of the perimeter wall portion 130 of the tub component 120. Also, the support beam 125 includes lateral sections 152 that extend from the bent corners of the beam at ends of the longitudinal members 150.

Figure 9:
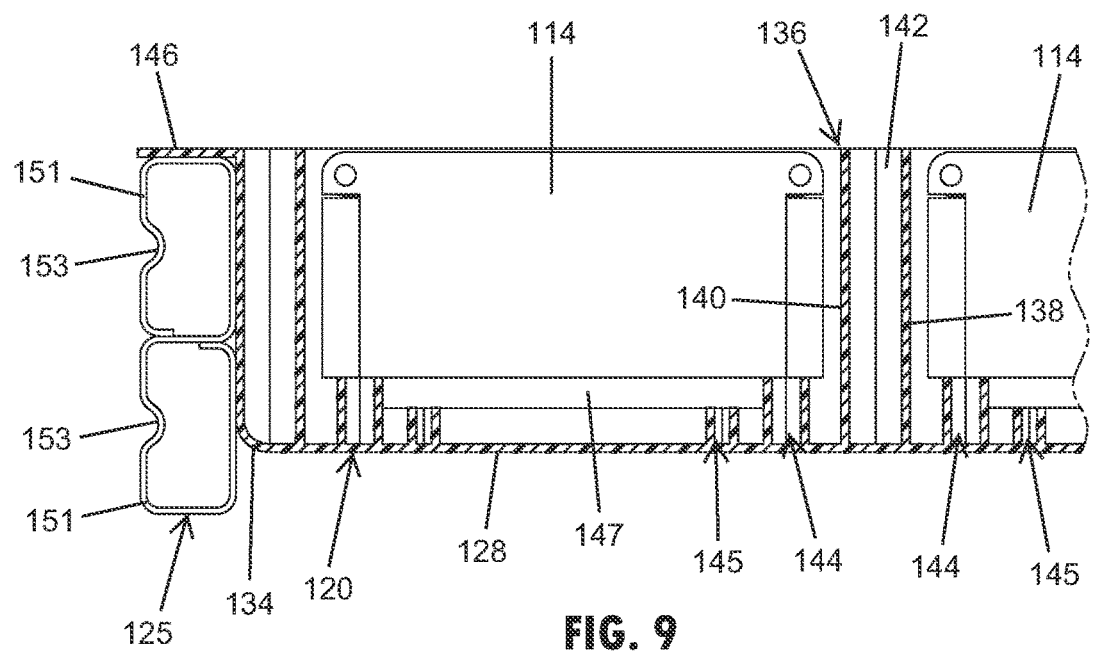
FIG. 9 is an enlarged, cross-sectional view of a rearward end portion of the battery tray shown in FIG. 8.

The longitudinal and lateral sections 150, 152 of the support structure 124 shown in FIGS. 6-10 are formed from the same single metal beam 125, which may have one or more hollow interior areas. As shown in FIG. 9, the illustrated beam 125 includes two hollow areas arranged with one disposed over the other in a mono-leg beam configuration roll formed from a metal sheet to provide adjacent, vertically stacked, tubes that include a common center wall disposed in a generally horizontal orientation and channel ribs 153 disposed along the outer portions of each adjacent tube 151. In forming the metal sheet into the single beam, outer portions of the metal sheet that extend from opposing sides of the common center wall may be bent generally simultaneously in the same rotational direction to attach respectively at opposing ends of the common center wall. The metal sheet or sheets that may form the beams or members of the support structure 124 may comprise a high strength steel, such as a cold worked martensitic steel, so as to be configured for absorbing and generally resisting intrusion from lateral impact forces to the battery tray 110.

Figure 7:
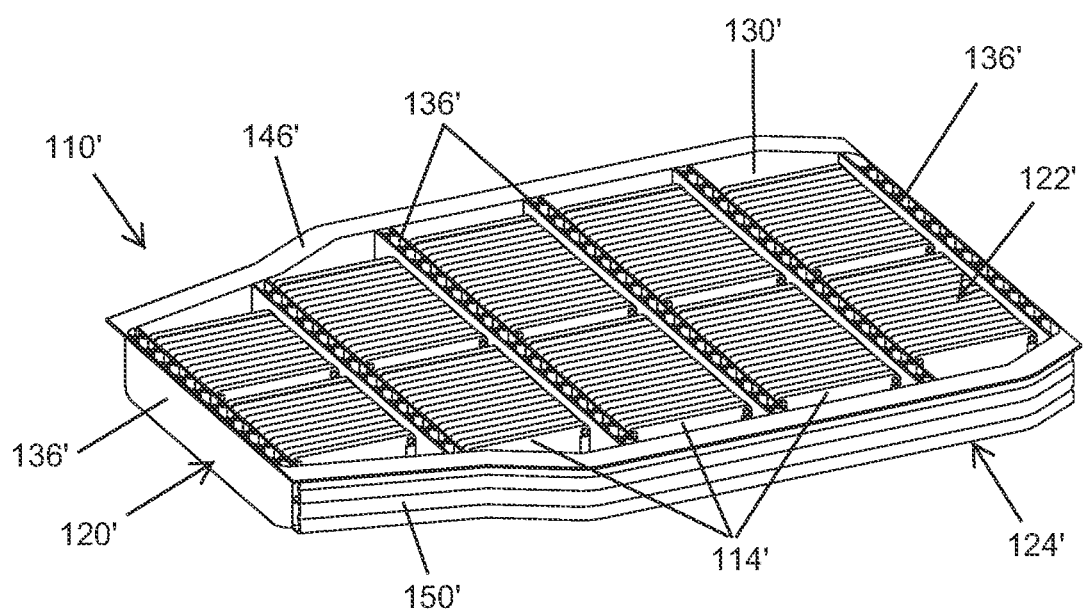
FIG. 7 is an upper perspective view of yet an additional embodiment of a battery tray having a cover removed to show the battery modules in the battery containment area.

Although otherwise similar to the embodiment shown in in FIG. 6, a battery tray 110' is shown in FIG. 7 having a support structure 124' that does not have the lateral sections 152 or a forward and rearward portion of the flange 146. As such, the support structure 124' shown in FIG. 7 includes longitudinal sections or members 150' that extend along and are coupled at the exterior surfaces of the longitudinal sections 150' of the perimeter wall portion 130' of the tub component 120'. Thus, in such an embodiment, the cross member portions 136' at the front and the rear of the tub component 120? may provide the forward and rearward ends of the battery tray 110'. Features of the battery tray 110' that are similar to the battery tray 110 are not described in detail again, and similar reference numbers are used with the addition of an apostrophe.

To engage the tub component 120 at or within the support structure 124, the flange 146 of the tub component 120 may engage an upper surface of the single beam of the support structure 124, such that the perimeter wall portion 130 of the tub component 120 may engage the inside vertical surfaces of the single beam of the support structure 124. Thus, the cover 126 may attach at the flange 146 of the tub component 120 such that the flange 146 may be sandwiched between the edge portion of the cover 126 and the support structure 124.

The tub component 120 of the battery tray 110 shown in FIGS. 6-10 includes a floor portion 128 and a perimeter wall portion 130 that integrally extends upward around a peripheral edge 132 of the floor portion 128 to border the battery containment area 122. The floor portion 128 and the perimeter wall portion 130 may together form a solid and uninterrupted interior surface. The floor portion 128 and the perimeter wall portion 130 may each include sections that are substantially planar, as shown in FIG. 8. Such planar sections may be generally perpendicular relative to each other, such that the angular transition between the floor portion 28 and the perimeter wall portion 30 may be generally ninety degrees, such as with a curved corner transition 134 as shown in FIG. 9.

Figure 10:
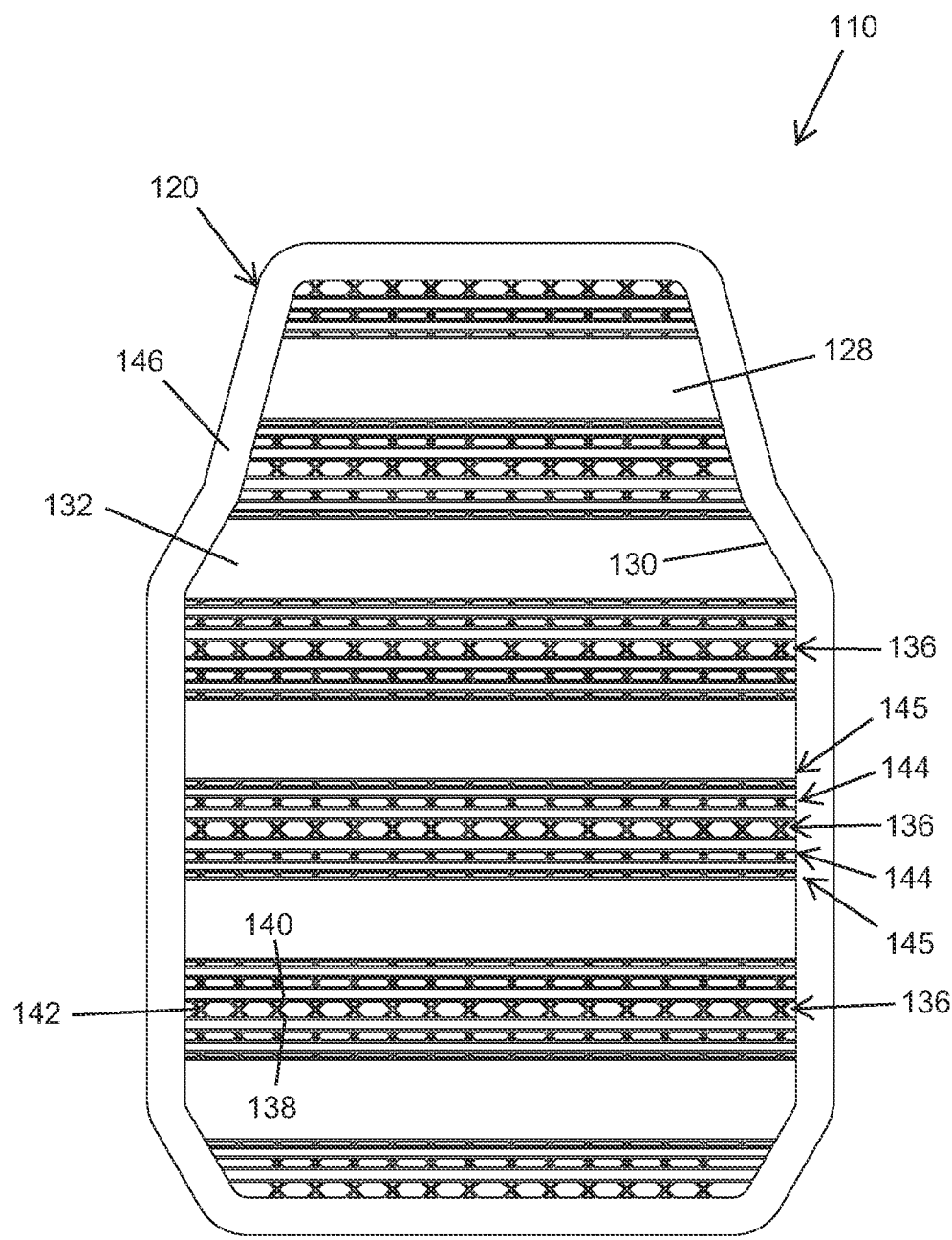
FIG. 10 is a top view of the battery tray shown in FIG. 6.

The tub component 120 also provides structural support to the battery tray 110, such that the support structure 124 or frame may be undersize, lightened, or partially or completely eliminated to allow the tub component to provide a portion or fraction of the overall desired load support capability of the battery tray 110. The tub component 120 shown in FIGS. 6-10 includes integral structural features that are formed as a single piece with the tub component. As shown in FIG. 8, the tub component 120 includes cross member portions 136 that each integrally interconnecting with the floor portion 128 and opposing sides of the perimeter wall portion 130. The cross member portions 136 span laterally across the battery containment area 122 to divide the battery containment area into separate compartments, such as shown in FIG. 10. The cross member portions 136 may extend upward at a height that is substantially equal to the perimeter wall portion 130, such that the separate compartments of the battery containment area 122 may be isolated from each other, such as to provide prevent cross-contamination of the battery modules and to insulate the batter modules form each other. The cross member portions 136 of the tub component 120 each extend laterally in parallel alignment with each other and at a longitudinal spacing from each other that is configured or sized for the defined compartment to contain at least one battery module 114.

As shown in FIGS. 6-10, the cross member portions 136 of the tub component 120 each include a forward wall 138 and a rearward wall 140 that each provide an interior surface of adjacent compartments of the battery containment area 122. The forward and rearward wall sections 138, 140 integrally interconnect with the floor portion 128 and wall portion 130 to form a solid and uninterrupted interior surface. The cross member portions 136 also include stiffening features 142 that integrally interconnect between the forward and rearward wall sections 138, 140 and that integrally extend upward from the floor portion 128 of the tub component 120. The stiffening features 142 shown in FIG. 10 include an x-shape when viewed from above, such that the stiffening features 142 have a generally consistent cross sectional shape along the vertical extent of the cross member portions 136.

With further reference to the tub component 120 shown in FIGS. 6-10, integral battery supports 144 are provided that integrally extend upward from the floor portion 128 of the tub component 120 adjacent to and generally parallel with the cross member portions 130. Also, cold plate supports 145 integrally extend upward from the floor portion 128 of the tub component 120 adjacent to and parallel with the battery supports 138. Similar to the structural design of the cross member portions 136, the battery supports 144 and cold plate supports 145 each have forward and rearward wall sections that extend upward from the floor in parallel alignment with each other and the forward and rearward wall sections 138, 140 of the cross member portions 136. Further, the battery supports 144 and cold plate supports 145 include stiffening features that integrally interconnect between the forward and rearward wall sections of the respective battery support and cold plate support in an x-shaped configuration. As shown in FIG. 9, the cold plate supports 145 have a height that is configured to place a cold plate or cooling element 147, such as a thermoelectric component or a liquid cooled component, against or in thermal engagement with the lower surface of the battery module 114.

The floor portion 128, the perimeter wall portion 130, the cross member portions 136, the battery supports 144, and the cold plate supports 145 of the tub component 120 shown in FIGS. 6-10 may be formed as a single integral piece from a sheet molding compound or like composite materials. With the sheet molding compound, a resin and composite material may be pressed into a die to form the desired features of the tub component, such that the integral structural features of the tub component may be formed in the direction of the press, such as in the vertical direction. It is also contemplated that the tub component may include carbon fibers, such as at a lower layer of the of the tub insert to provide additional stiffness and intrusion resistance. The tub component 120 may provide the battery containment area 122 with an interior surface that is sealed and resistant to leaks or penetration of gases or liquids, so to protect the batteries or battery modules 114 supported in the tub component 120. Features of the battery tray 110 that are similar to the battery tray 10 are not described in detail again, and similar reference numbers are used, incremented by 100.

Figure 11:
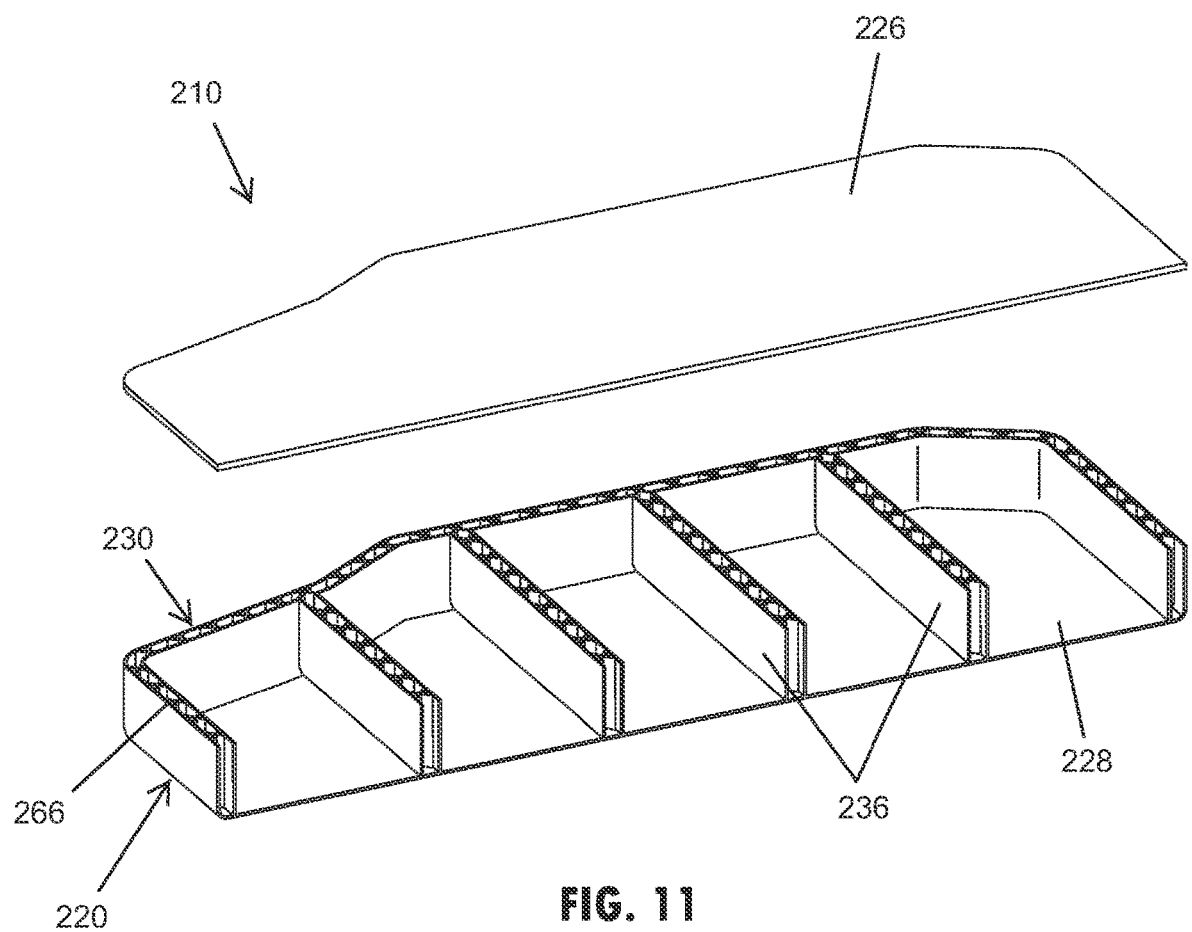
FIG. 11 is an exploded, cross-sectional, upper perspective view of an additional embodiment of a battery tray, showing the cross section taken centrally along a length of the battery tray.
Figure 12:
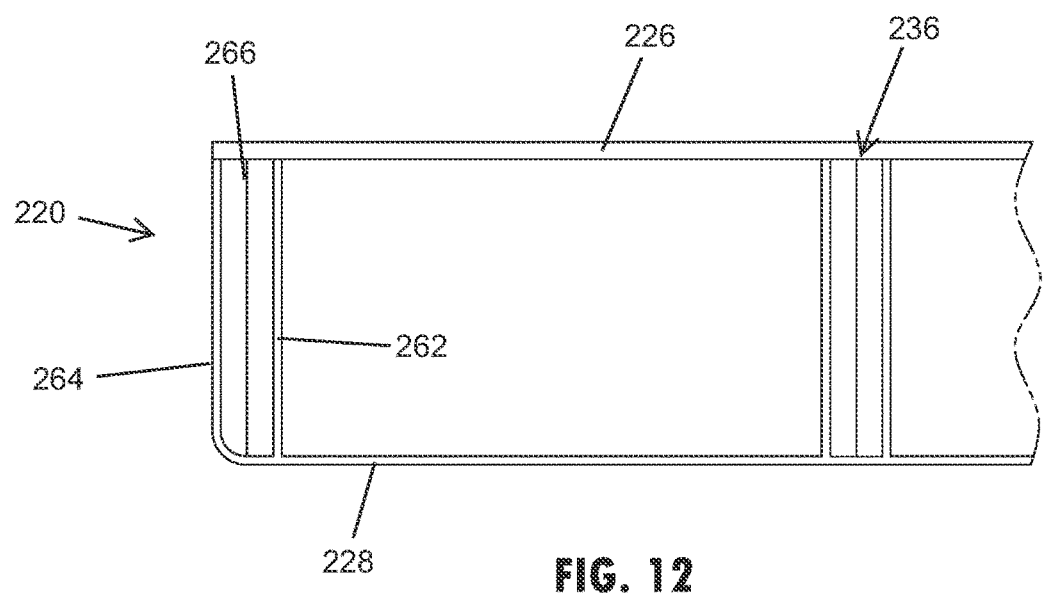
FIG. 12 is an enlarged, cross-sectional view of a rearward end portion of the battery tray shown in FIG. 11.
Figure 13:
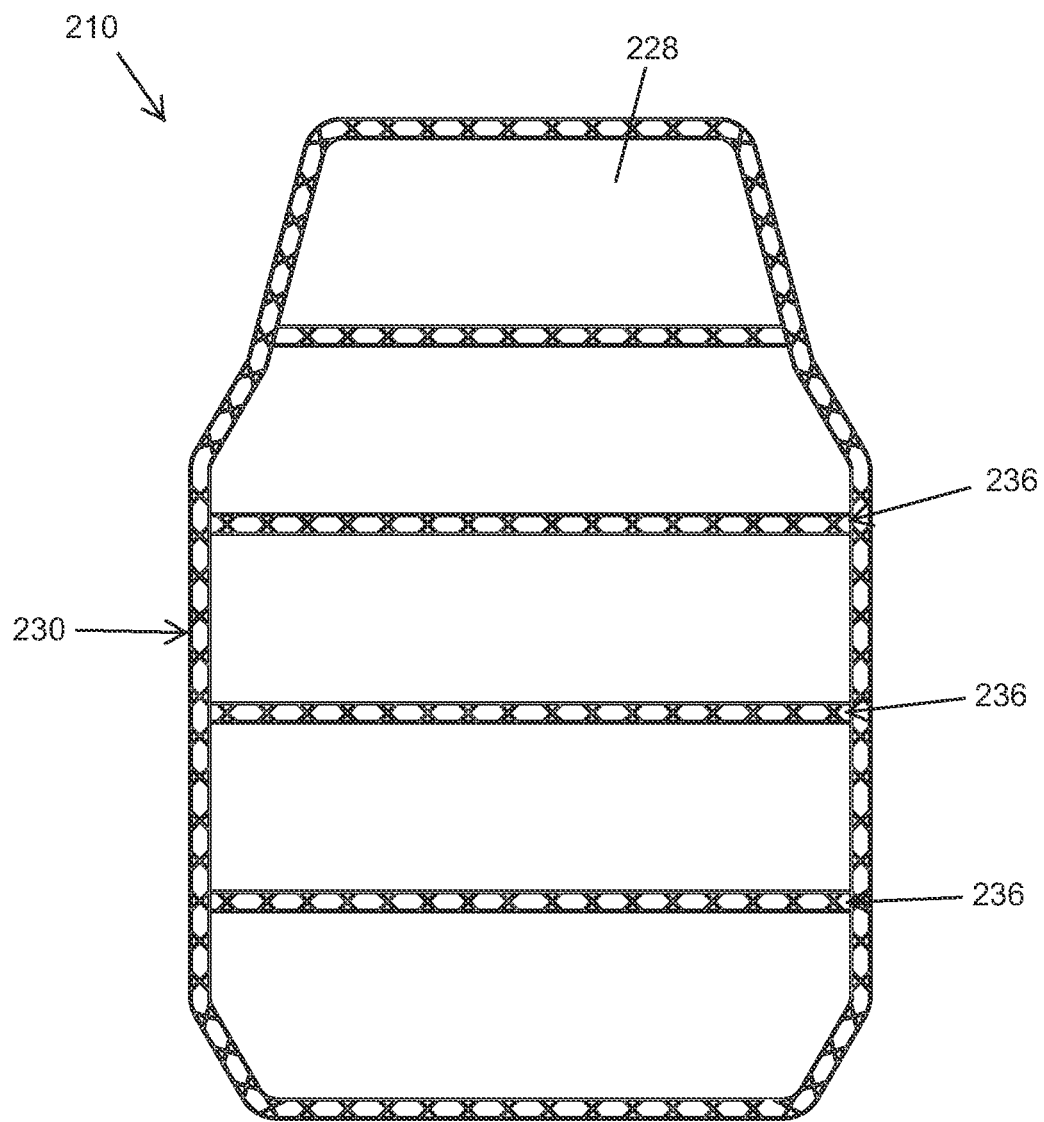
FIG. 13 is a top view of the battery tray shown in FIG. 11 having the cover removed.

Referring now to FIGS. 11-13, an additional embodiment of the battery tray 210 may include a tub component 220 that is configured with integrate structural features to support the contained battery modules without structure 124 without a separate support structure to hold or reinforce any portion of the tub component 220. As such the battery tray 210 may be provided with a tub component 220 that does not include any supplemental base frame, such that the tub component 220 provides the structural integrity necessary to independently support and protect the contained batteries. The tub component 220 shown in FIGS. 11-13 includes a floor portion 228 and a perimeter wall portion 230 that integrally extends upward around a peripheral edge 232 of the floor portion 228. The tub component 220 has cross member portions 236 that integrally interconnect with the floor portion 228 and opposing sides of the perimeter wall portion 230. To provide the desired supportive and protective structural features of a battery tray, the perimeter wall portion 230, like the cross member portions 236, may include an interior wall section 262, an exterior wall section 264, and stiffening features 266 that integrally interconnect between the interior and exterior wall sections 262, 264. To secure the tub component 220 to the vehicle frame, the perimeter wall portion 230 may also include an attachment feature for mounting the tub component to a frame portion, such as for fastening to the rocker rails or the like. The tub component 220 may further include alternative or additional integral structural features that are formed as a single piece with the tub component, such as to support the weight of the batteries or battery modules and to provide structure configured for impact energy management, among other functions. Features of the battery tray 210 that are similar to the battery tray 10 are not described in detail again, and similar reference numbers are used, incremented by 200.

It is also conceivable that the stiffening features, such as those that extend between wall sections of the cross member portions or perimeter wall portion, may not have a section of the floor portion extending between the wall sections, such that an opening may be provided that extends vertically through the respective cross member portion or perimeter wall portion. Such a lack of a floor portion and vertical opening may also be provided at a similarly constructed battery support and cold plate support or other structure that integrally extend upward from the floor portion of the tub component.

Figure 14:
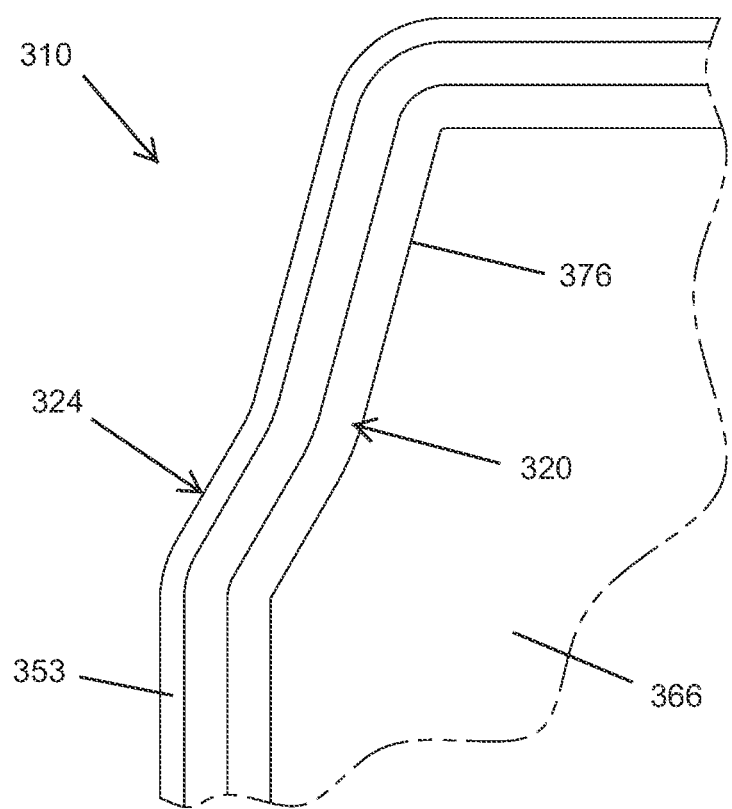
FIG. 14 is a top view of a corner portion of an additional embodiment of a battery tray having the cover removed.
Figure 14A:
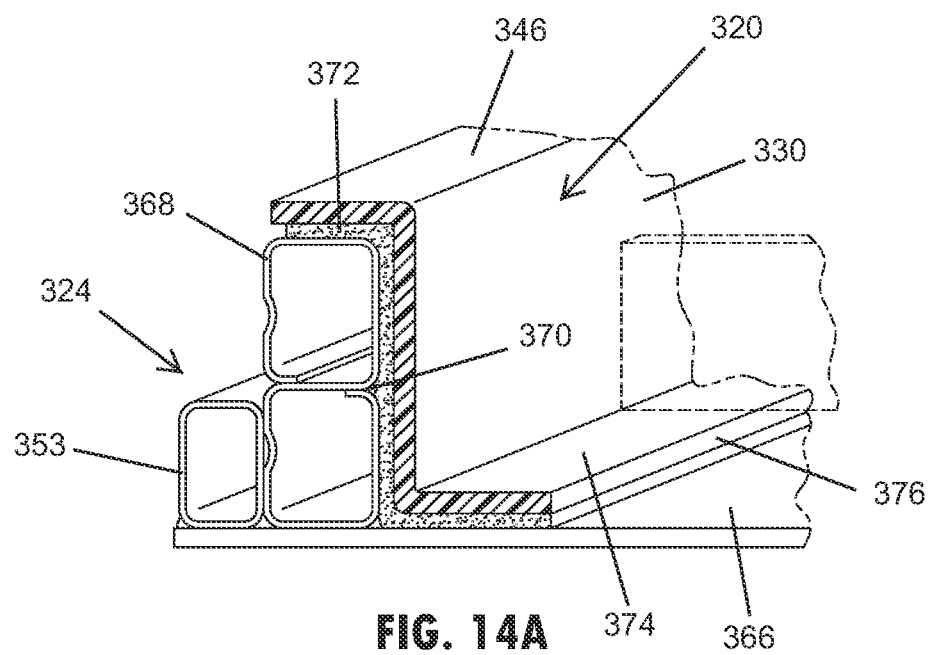
FIG. 14A is a cross-sectional, upper perspective view of the portion of the battery tray shown in FIG. 14, showing an internal cross member of the battery tray in dashed lines.

Referring now to FIGS. 14 and 14A, a battery tray 310 is provided that has a support structure 324 that includes a floor panel 366 and a peripheral reinforcement member 368 attached at a peripheral edge portion of the floor panel 366. The support structure 324 also includes an outboard extension beam 353 is attached along an outer surface of the peripheral reinforcement member 368, where the outboard extension beam 353 has a tubular shape. The outboard extension beam 353 may be provided to use as an attachment structure and interface with the vehicle, such as to attach at the rocker rails or similar structure of the vehicle frame. The tub component 320 shown in FIGS. 14 and 14A has a perimeter wall portion 330 configured to engage an interior surface of the peripheral reinforcement member 368 at a seam interface 370 between the floor panel 366 and the peripheral reinforcement member 368 to seal the seam interface 370 and at least partially border the battery containment area 322. The seal of the seam interface 370 may be provided by an adhesive 372 that is disposed between the tub component 320 and the support structure 324.

The tub component 320 also has a flange 346 that extends outward from the perimeter wall portion 330 and away from the battery containment area 322. The flange 346 engages an upper surface of the peripheral reinforcement member 368 to provide an interfacing surface for attaching a cover of the battery tray 310. The tub component also has a lower flange 374 that extends inward from the lower edge of the perimeter wall portion 330 and toward the battery containment area 322. The lower flange 374 engages along the floor panel 366 of the support structure 324 so as to similarly seal the seam interface 370. As shown in FIG. 14A, the upper and lower flanges 346, 374 of the tub component 320 are generally parallel to each other and generally perpendicular to the perimeter wall portion 330. Moreover, as shown in FIG. 14, the lower flange 374 of the tub component 320 includes an inside edge 376 that surrounds a central opening of the tub component 320 that exposes the floor panel 366 of the support structure 324 in the battery containment area 322. Features of the battery tray 310 that are similar to the battery tray 10 are not described in detail again, and similar reference numbers are used, incremented by 300.

Figure 15:
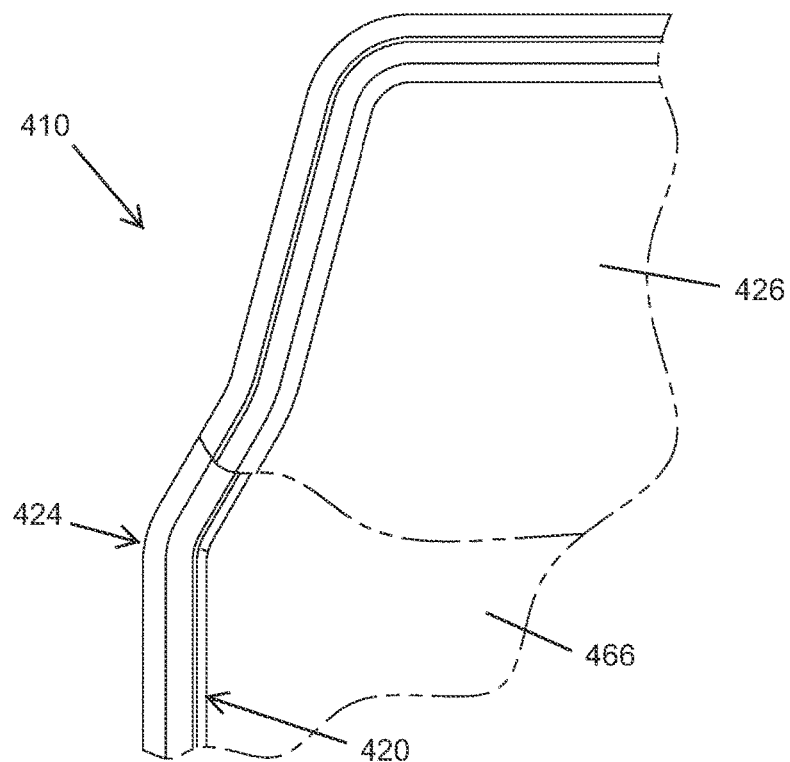
FIG. 15 is a top view of a corner portion of an additional embodiment of a battery tray having the cover partially cut away.
Figure 15A:
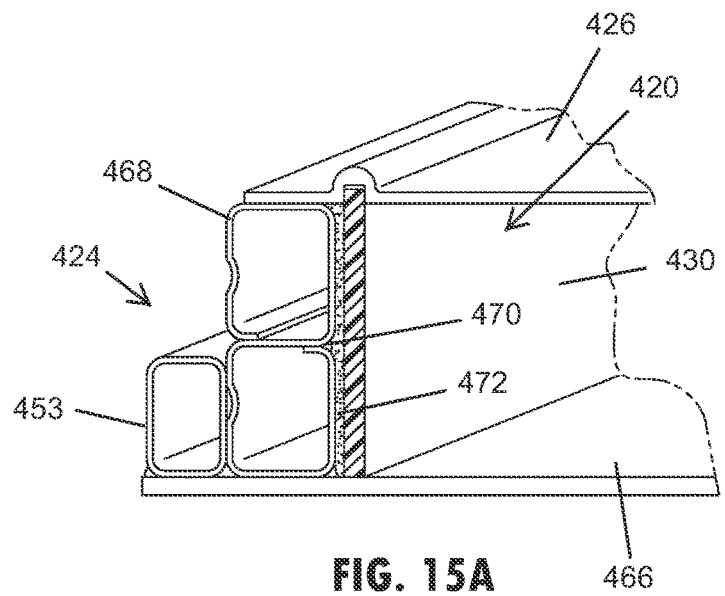
FIG. 15A is a cross-sectional, upper perspective view of the portion of the battery tray shown in FIG. 15, showing a cover engaged over a tub component.
Figure 15B:
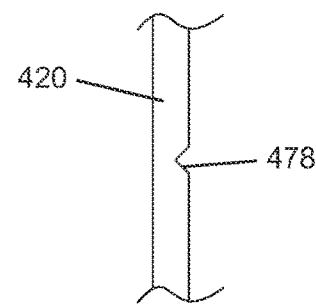
FIG. 15B is a top view of a portion of the tub component of FIG. 15 shown outside the battery tray and having a notch that allows for fitting the corner portion shown in FIG. 15.
Figure 16:
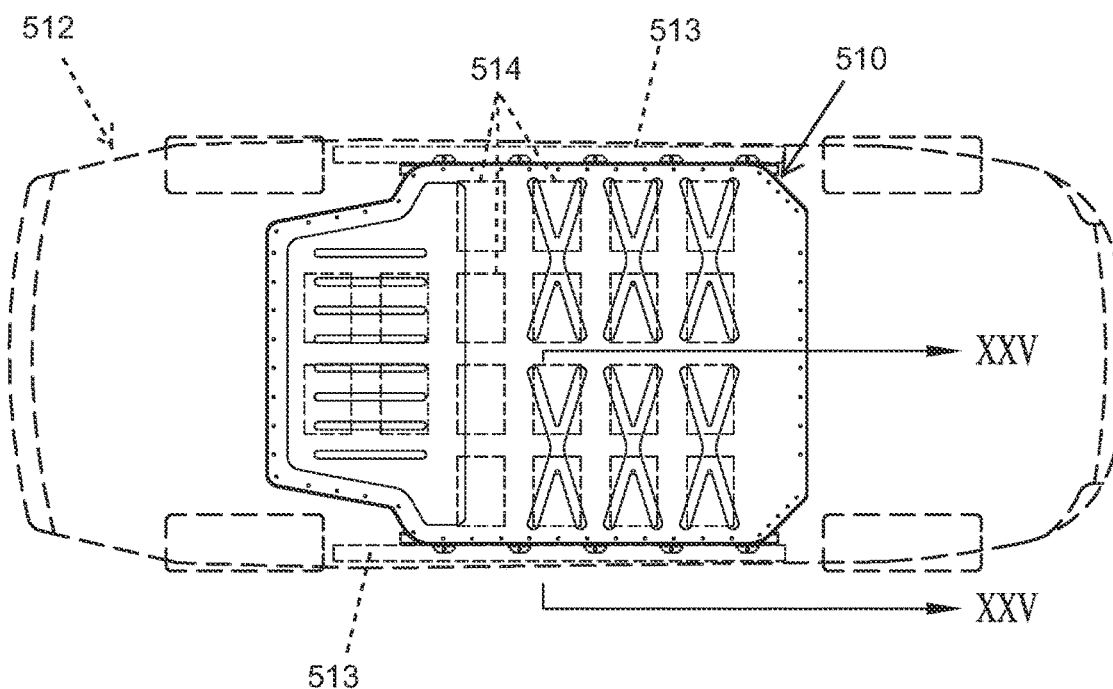
FIG. 16 is a top view of an additional embodiment of a battery tray showing an outline of a vehicle in dashed lines and the battery tray engaged at the rocker rails of the vehicle.

Referring now to FIGS. 15-15B, a battery tray 410 is provided that has support structure 424 that includes a floor panel 466 and a peripheral reinforcement member 468 attached at a peripheral edge portion of the floor panel 466 to at least partially border the battery containment area 422. The tub component 420 has a perimeter wall portion 430 configured to engage an interior surface of the peripheral reinforcement member 468 and extend upward from the lower seam interface 470 between the floor panel 466 and the peripheral reinforcement member 468. The perimeter wall portion 430 may extend upward beyond the height of the peripheral reinforcement member 468, such as shown in FIG. 15A, so as to provide a protrusion for engaging the cover 426 of the battery tray 410. The sealing provided by the tub component includes an adhesive 472 that is disposed between the tub component 420 and the support structure 424. In this embodiment, the tub component 420 may be installed on the support structure by applying the perimeter wall portion 430 at the interior surface of the support structure 424, such as by unrolling it from a spool. To bend the tub component 420 at interior corners of the support structure 424, a notch 478 may be provided to allow the material to bend, such as shown in FIG. 15B, such as polymeric material or the like. Features of the battery tray 410 that are similar to the battery tray 10 are not described in detail again, and similar reference numbers are used, incremented by 400.

Figure 17:
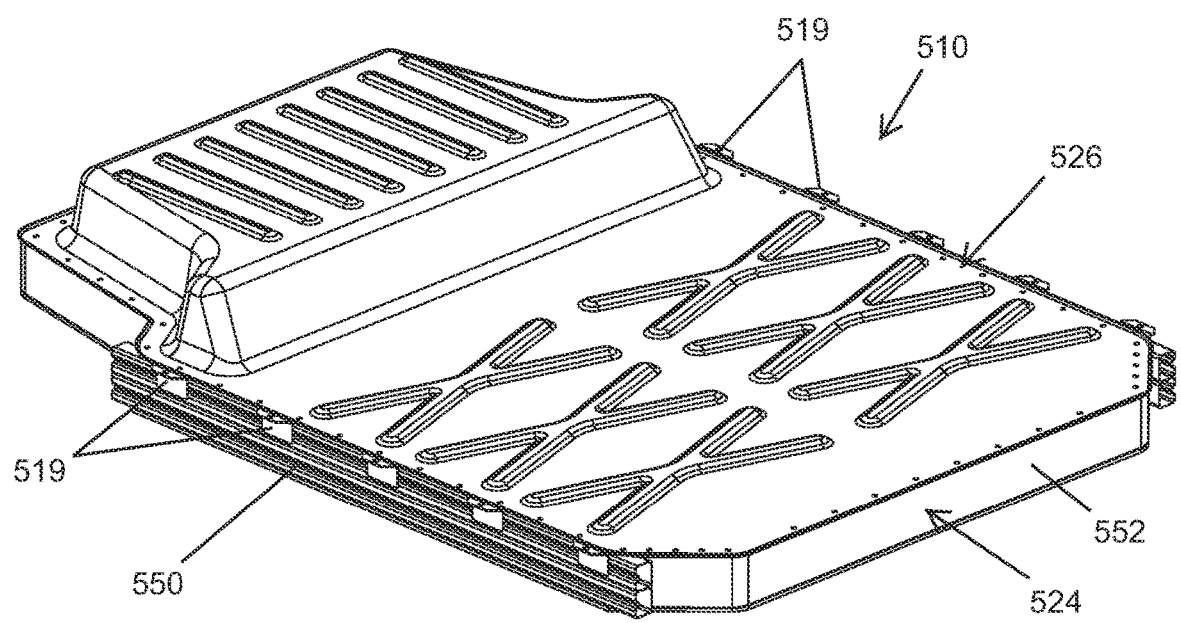
FIG. 17 is an upper perspective view of the battery tray shown in FIG. 16.
Figure 18:
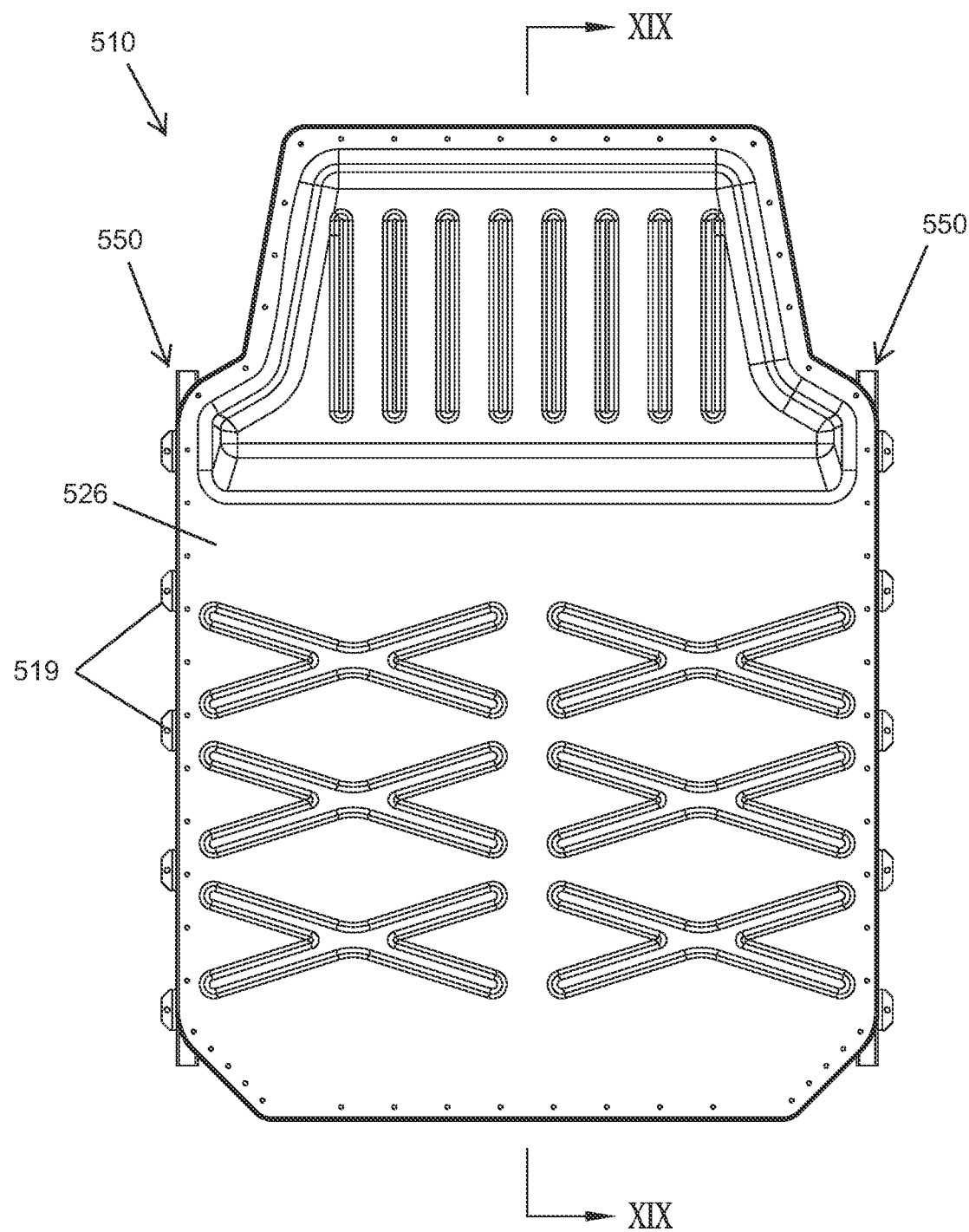
FIG. 18 is a top view of the battery tray shown in FIG. 16.
Figure 21:
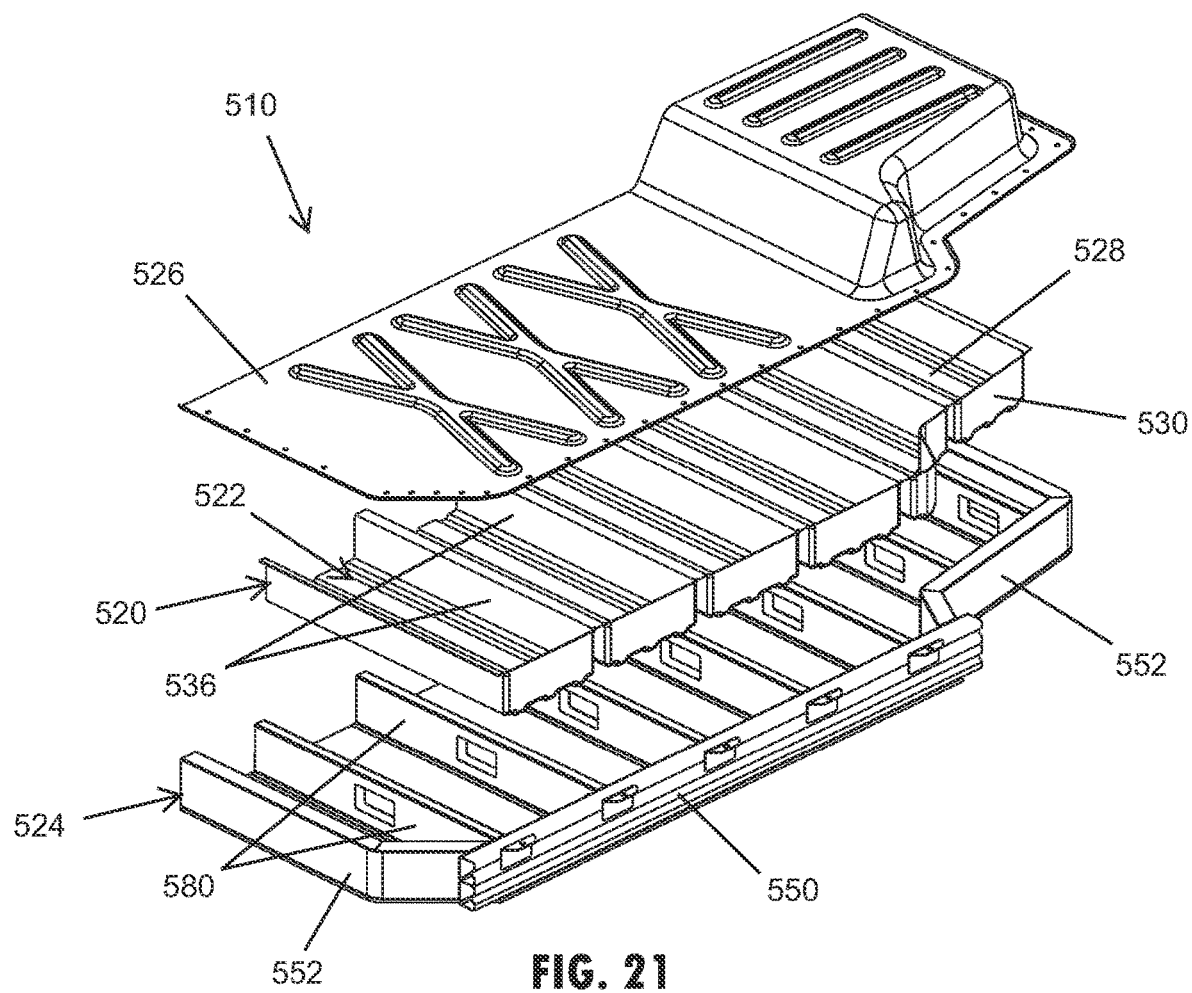
FIG. 21 is an exploded, upper perspective view of the section of the battery tray shown in FIG. 20, taken from the outer side of the battery tray.

Referring now to FIGS. 16-29, a battery tray 510 includes a support structure 524 and a tub component 520 that is disposed in the support structure 524 for supporting and containing the battery modules 514. As shown in FIG. 17, the illustrated support structure 524 includes longitudinal sections or members 550 that are configured to extend longitudinally relative to an associated vehicle 512, such as for attaching at or near the rocker rails 513 via the brackets 519 to secure the battery tray 510 to the vehicle frame and suspend it away from the ground surface at an inboard location that does not substantially come into a line of sight of a person standing outside of the vehicle 512. The battery containment area 522 of the battery tray 510 is generally bound on four sides by the two longitudinal members 550 that attach at or near the opposing rocker rails 513 and by lateral sections or members 552 that each extend laterally between the longitudinal members 550 at the front and rear end portions of the battery tray 510. As shown in FIG. 21, the support structure 524 also includes cross members 580 that attach at and span laterally between the longitudinal members 550, so as to span across and sub-divide the battery containment area 522 into separate battery compartments.

Figure 22:
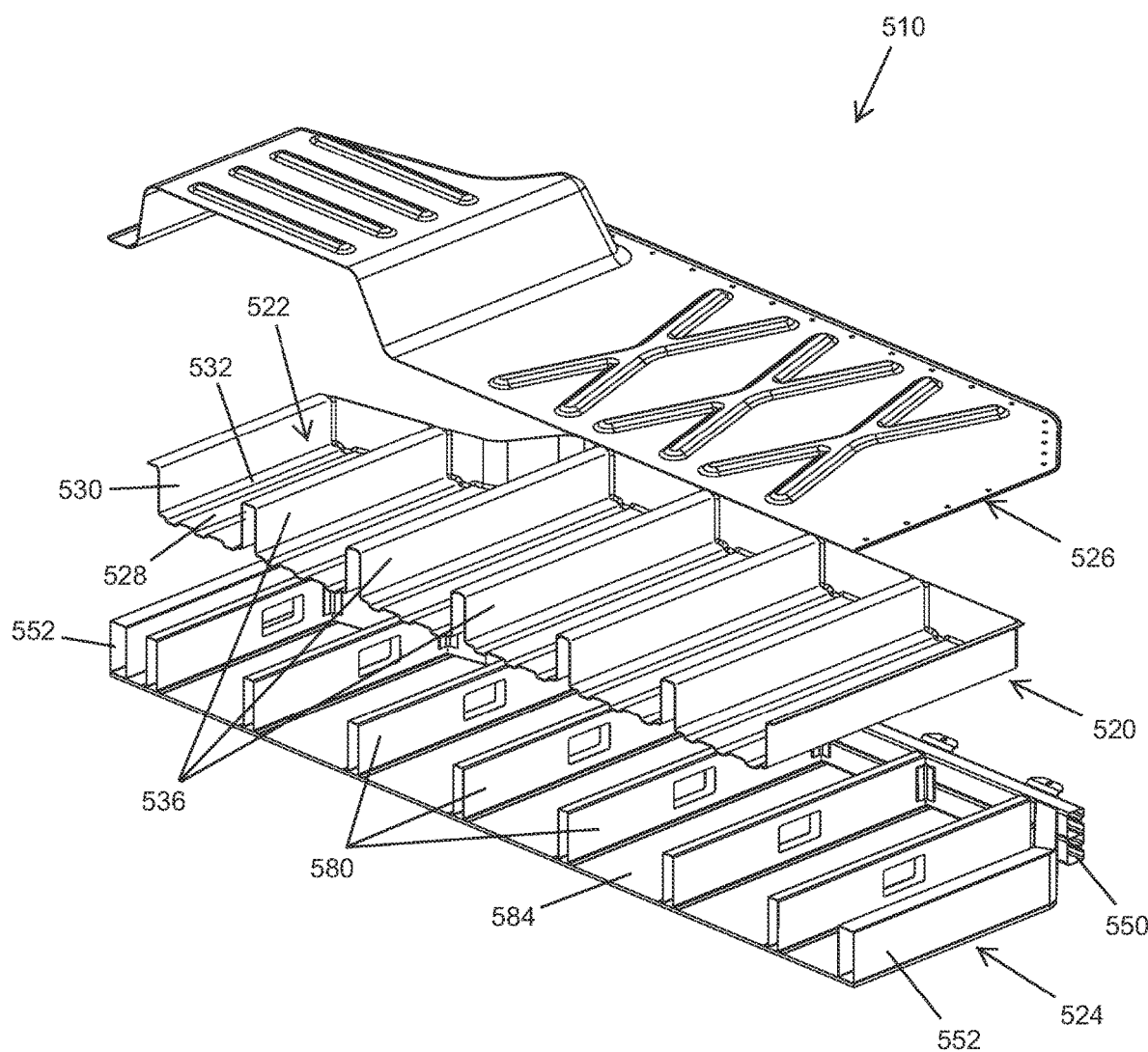
FIG. 22 is an exploded, upper perspective view of the section of the battery tray shown in FIG. 19, taken from an inner side of the illustrated section of the battery tray.
Figure 23:
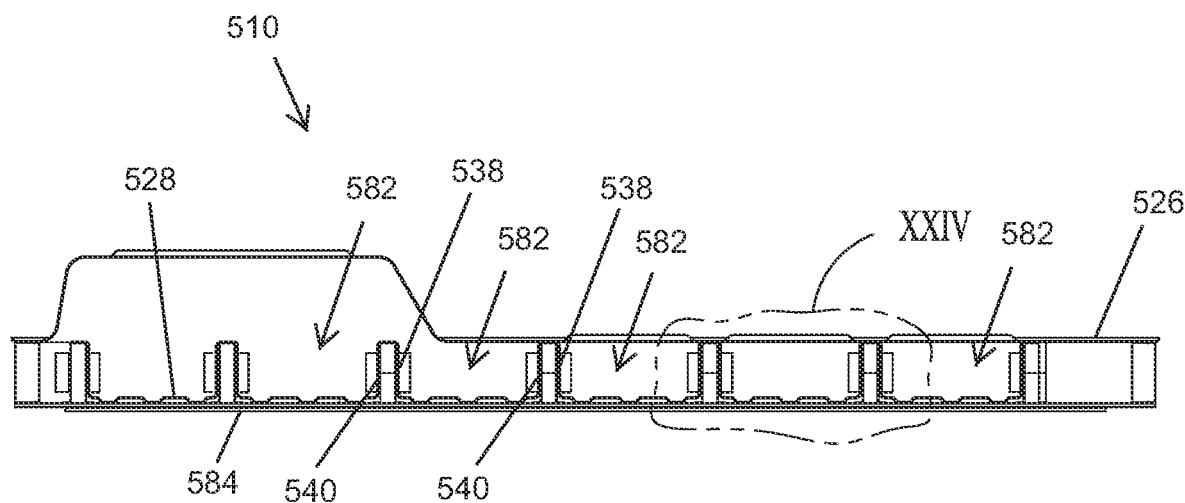
FIG. 23 is an elevation view of the section of the battery tray shown in FIG. 19, taken from the inner side of the illustrated section of the battery tray.
Figure 24:
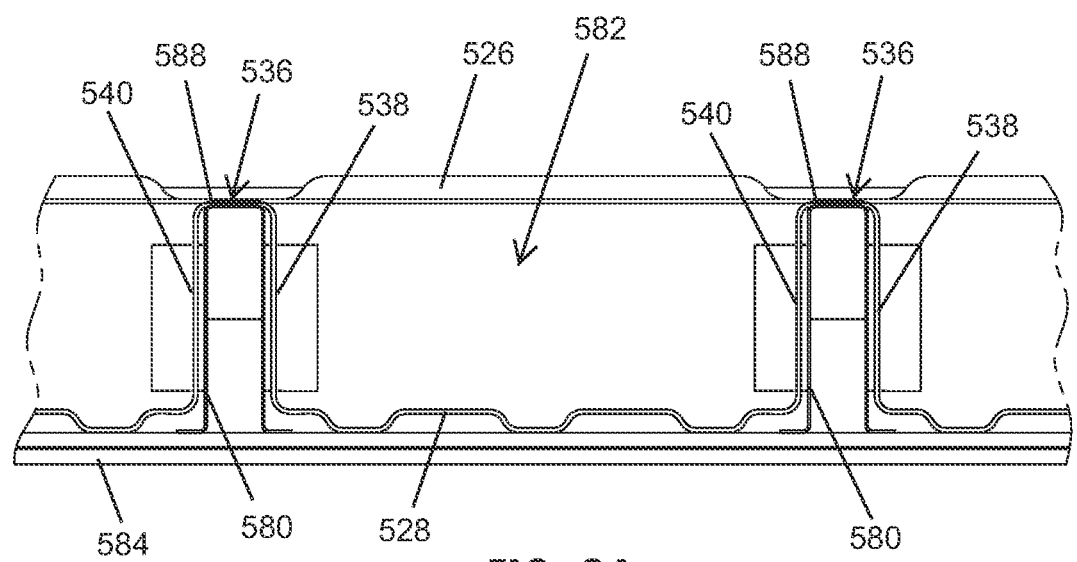
FIG. 24 is an enlarged view of a portion the battery tray shown in FIG. 23, taken at the area marked as XXIV in FIG. 23.
Figure 25:
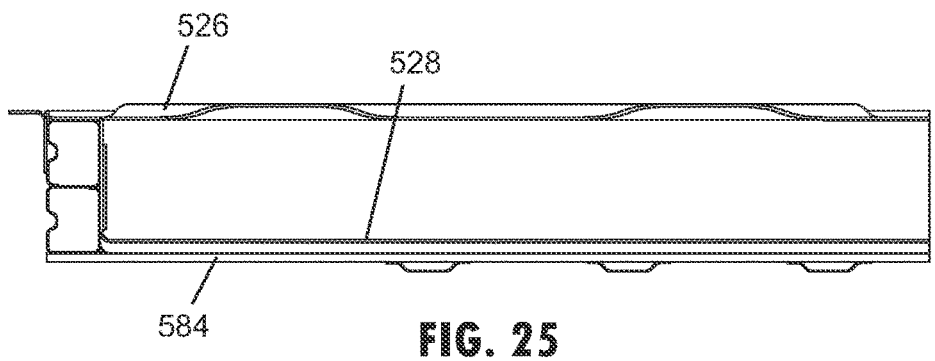
FIG. 25 is a cross-sectional view of the cross section of the battery tray shown in FIG. 23.

The tub component 520 shown in FIGS. 19-29 includes a floor portion 528 and a perimeter wall portion 530 that integrally extends upward from a peripheral edge 532 of the floor portion 528. The tub component 520 also includes cross member portions 536 that each integrally interconnecting with the floor portion 528 and opposing sides of the perimeter wall portion 530, such that the cross member portions 536 span laterally across the battery containment area 522 to divide the battery containment area 522 into separate compartments 582 for containing the battery modules, such as shown in FIG. 23. The cross member portions 536 of the tub component 520 may include a forward wall 538 and a rearward wall 540, such as shown in FIG. 24, which each provide an interior surface of adjacent compartments of the battery containment area 522.

Figure 19:
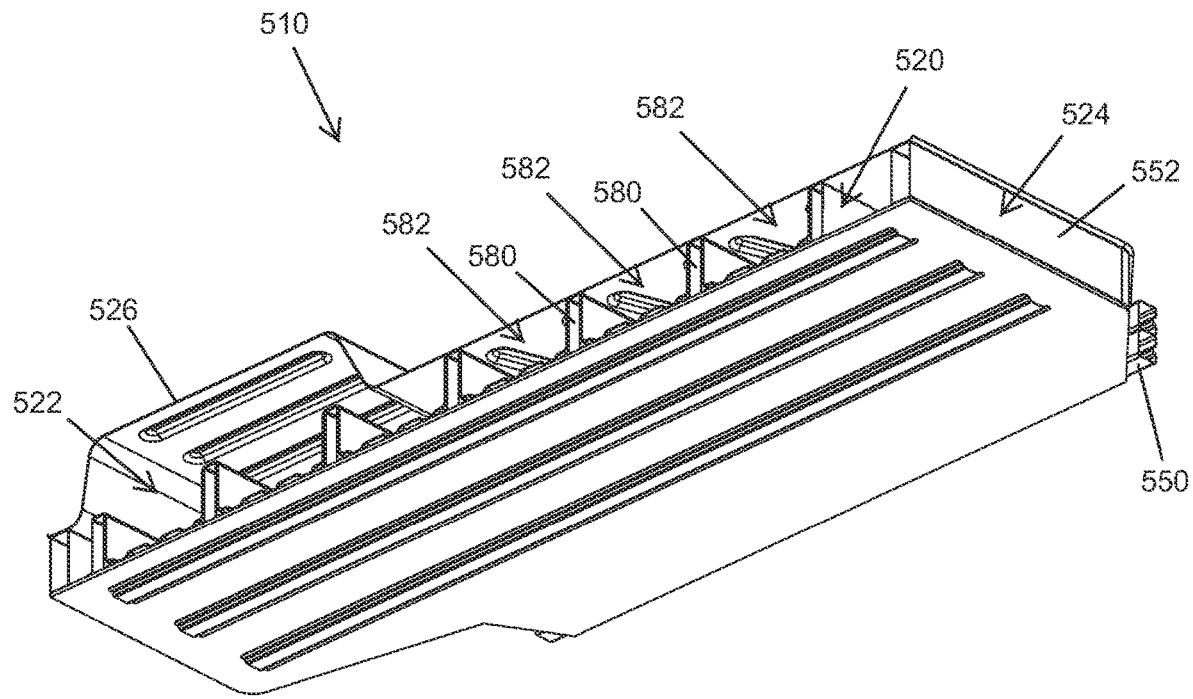
FIG. 19 is a cross-sectional, lower perspective view of the battery tray shown in FIG. 18, taken at line XIX-XIX shown in FIG. 18.
Figure 20:
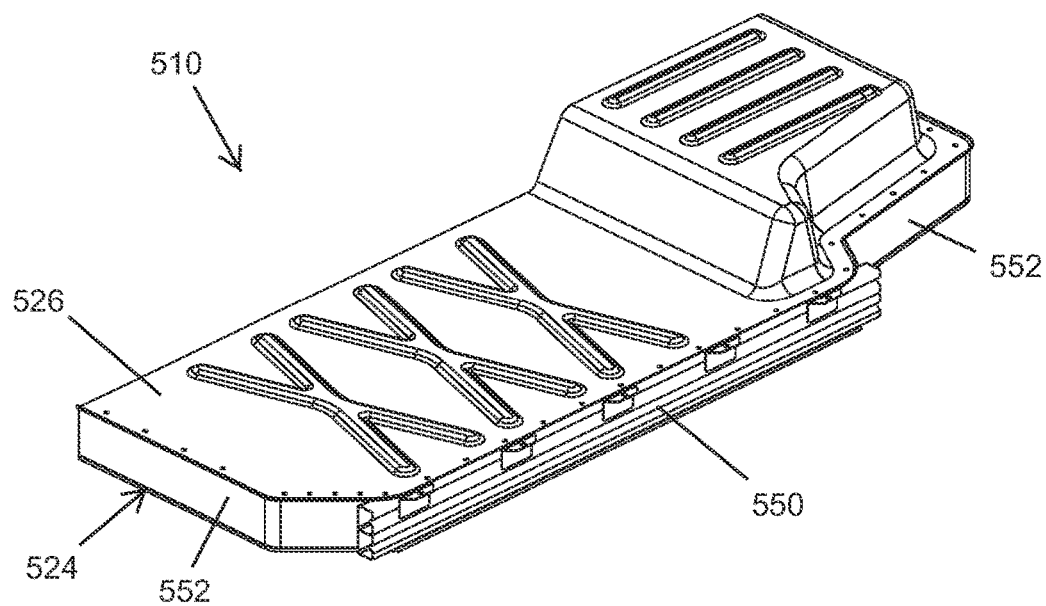
FIG. 20 is an upper perspective view of the section of the battery tray shown in FIG. 19, taken from an outer side of the battery tray.

As shown in FIG. 19, the tub component 520 is inserted or disposed in the support structure 524 with the containment portions 582 interposed between the cross members 580 in the battery containment area 522. The containment portions 582 may each include a perimeter wall that comprises a section of the perimeter wall portion 530 and the wall sections 538, 540 of the cross member portions 536, where such perimeter wall integrally connects around a perimeter of a section of the floor portion 528, so as to form a tub-like shape that defines a container volume of each containment portion 582. The containment portions 582 each have a lateral dimension that generally extends between the lateral boundaries of the inside surfaces of the perimeter wall portion 530 that extends upright and engages along the inside surface of the longitudinal members 550. Further, the longitudinal dimension of each containment portion 582 generally extends between adjacent cross members portions 580, such as shown in FIG. 24.

As shown in FIGS. 23 and 24, the floor portion 528 of the containment portions 582 of the tub component 520 may disposed at and at least partially resting on a portion of the support structure 524, such as a floor panel 584 of the support structure 524. As shown in FIGS. 5 and 8, the floor panel 584 may have a plate-like shape that spans below the cross members 580 and attaches at the longitudinal members 550. Alternatively, the floor member in additional embodiments may attach at the cross members or be integrally formed therewith, so as to provide a similar floor structure to support the lower portion of the tub insert. A seal may optionally be provided between the floor panel 584 and the cross members 580 and the longitudinal members 550, such as with a gasket, sealing agent, or other sealing material, such as an epoxy or silicone sealant or the like. Optionally, a sealing agent or sealing material, such as an epoxy or silicone sealant or the like, may be provided at interface seams or along the longitudinal members 550 or other components within the battery containment area to reinforce the seal along the inside wall surface of the longitudinal members 550. Such a seal at the support structure 524 may be a secondary or backup seal to the containment provided by the sealed tub component 520 that contains the battery modules and related components. However, it is understood that such sealed battery containment areas or portions may be vented for accommodating battery swelling or contraction, such as at a vented opening that is difficult for water or liquid or debris to enter, such as by locating the vented opening at an upper portion or interior portion of the battery tray or by providing the vented opening with a membrane or fabric cover that is air permeable and liquid impermeable to provide the desired liquid sealed environment for storing the batteries or electrical equipment or other vehicle-related item in the battery tray.

Figure 26:
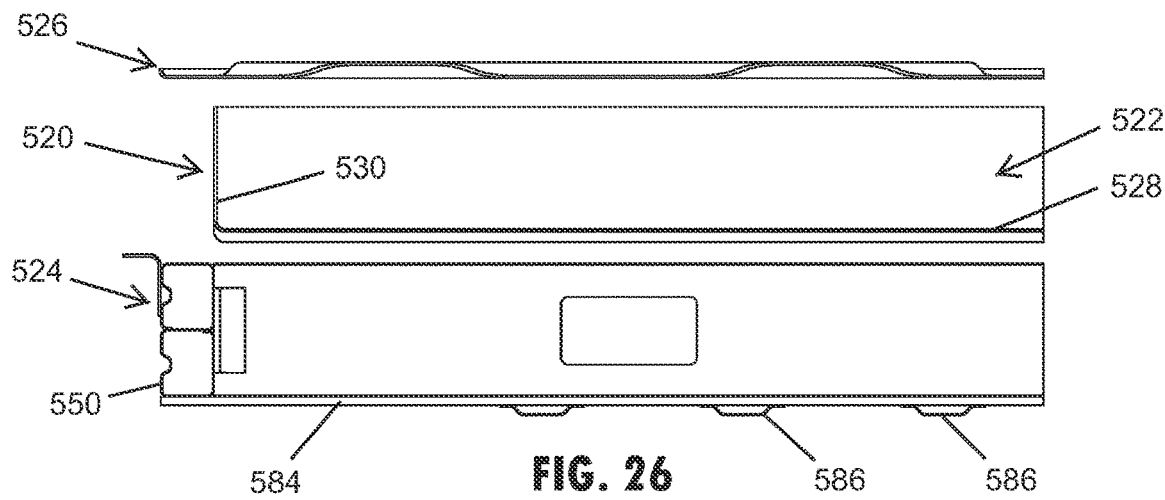
FIG. 26 is an exploded view of the section of the battery tray shown in FIG. 25.
Figure 27:
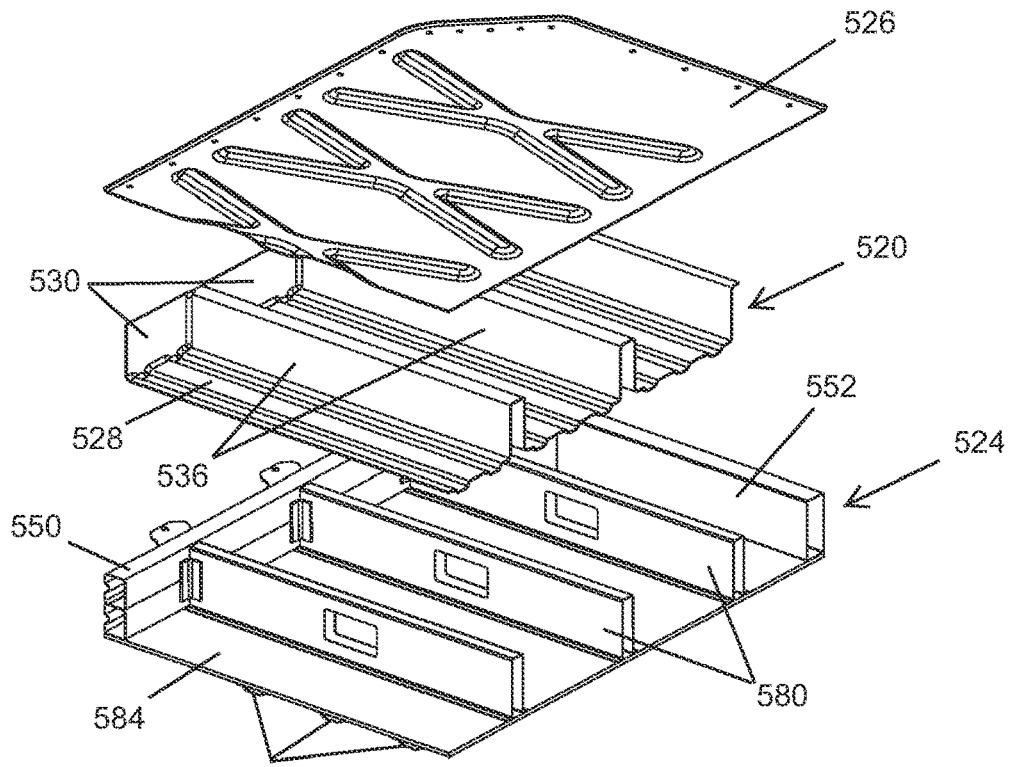
FIG. 27 is an upper perspective view of the exploded view of the section of the battery tray shown in FIG. 26.

The floor panel 584 of the support structure 524 may also include integrally formed or separately attached stiffening ribs or channels, such as the stiffening strips 586 attached at and extending longitudinally along the bottom surface of the floor panel 584, such as shown in FIGS. 26 and 27. Similarly, the floor portion 528 of the containment portions 582 of the tub component 520 may optionally be formed with raised portions or depressions or channels or ribs or the like, such as to provide a corrugated shape as shown in FIGS. 22-24, where the raised portions provide corrugated ribs extending laterally across the tub component 520. These laterally extending corrugated ribs have a shape that can provide stiffness and bending strength to the floor portion 528 of the tub component 520. Also, as further illustrated in FIG. 24, the raised portions that provide the corrugated ribs may be intermittent or undulate to provide corresponding depressed portions that may contact the floor panel 584, so as to space the battery interfacing portion of the floor portion 528 away from the floor panel 584. Thus, the corrugated ribs may provide additional intrusion area or spacing between the floor panel 584 from the battery modules, which may conceivably rest or mount at or near the raised portions of the floor portion.

Figure 28:
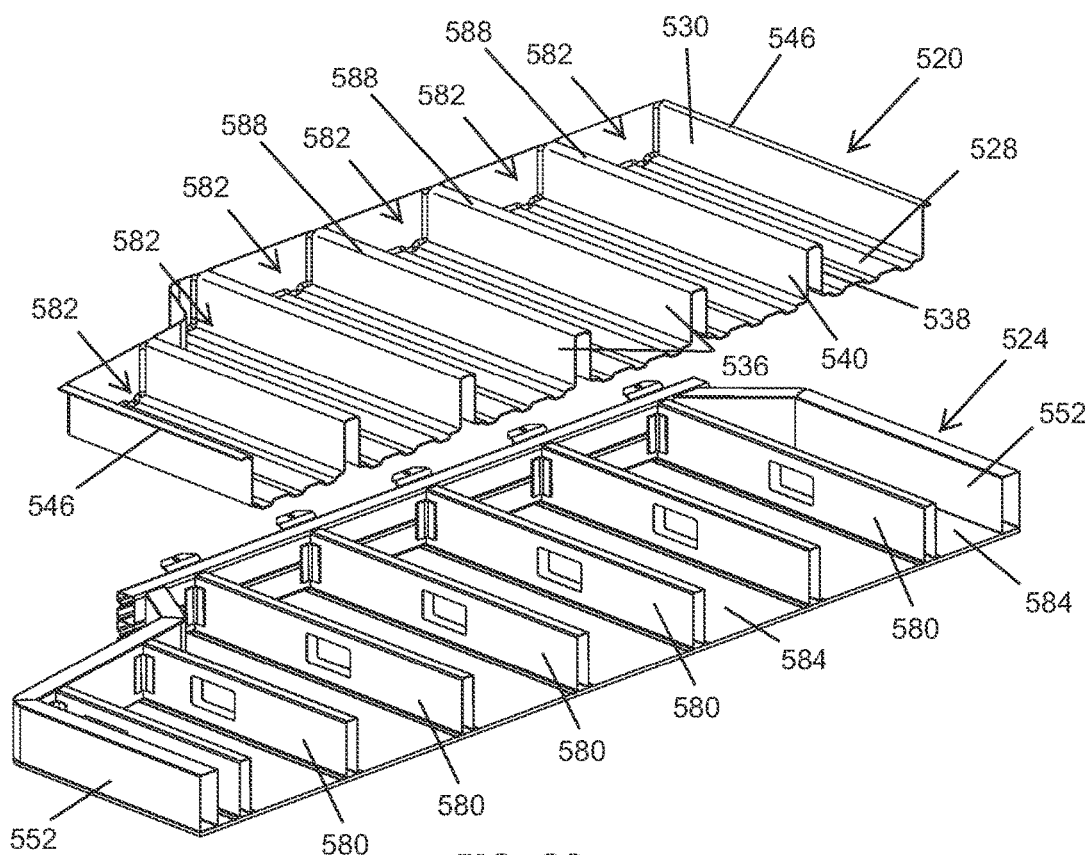
FIG. 28 is an exploded, upper perspective view of the section of the tub component and support structure shown in FIG. 19, taken from an inner side of the illustrated section of the battery tray.
Figure 29:
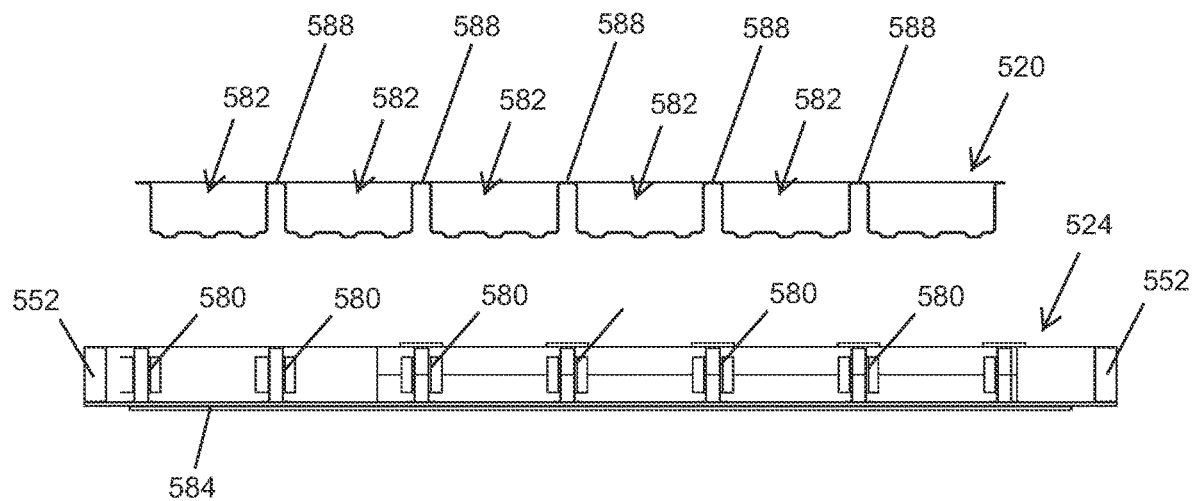
FIG. 29 is an elevation view of the section of the tub component and support structure shown in FIG. 19, taken from an inner side of the illustrated section of the battery tray.

The cross member portions 580 of the tub component 520 may also include upper reinforcements 588 that interconnect upper sections of the wall sections 538, 540 of the cross member portions 536, such that each upper reinforcement 588 extends over one of the cross members 580 of the support structure. As such, the cross member portions 580 of the tub component 520 cover the exposed upper surfaces of the cross members 580. The upper reinforcement 588 integrally connect two adjacent containment portions on opposing sides of a cross member 580, where the upper reinforcement 588 extends from upper edges of the wall section 538, 540 to from an inverted U shape, such as shown in FIG. 24. The As further illustrated in FIG. 10, may also rest on and engage an upper surface of a respective cross member 580 to vertically support the tub component 520. Furthermore, as shown in FIGS. 27 and 28, the longitudinal ends of the tub component 520 may include a flange portion 546 that extends from a least a section of an upper periphery of the tub component 520. The flange portion 546 rests on a corresponding peripheral portion of the support structure 524 and may define an upper rim surface of the tub component 520, so as to engage a cover.

The tub component, or portions thereof, may provide structural support to the battery tray, such that the support structure may be undersize or lightened to allow the tub insert to provide a portion or fraction of the overall desired load support capability of the battery tray. Such additional structural support may be increased when bonding or fusing portions of the tub component to the support structure, so as to localize the increased structural support. For example, an adhesive or epoxy or the like may be provided along the cross members 580 for bonding to the upper reinforcements 588 of the tub component and thus improving the stiffness of the cross members for reducing side deformation to the battery tray from side vehicle impact.

It is contemplated that the components of the support structure may be alternatively configured from the illustrated embodiment and may be attached, such as via welding, fasteners and/or adhesive or the like, or may otherwise be partially or completely formed together, as further discussed herein. As shown in FIG. 28, the lateral members 552 are formed with a generally consistent rectangular shaped cross section with a fixed height that respectively defines the height of the front and rear portions or walls of the battery containment area. The longitudinal members 550 are formed to provide a height that is substantially identical to the fixed height of the lateral members 552, such that there is generally a constant height about the peripheral walls of the battery containment area 522. This consistent peripheral wall height provides even or generally flush top and bottom surfaces of the peripheral walls for attaching the cover 526 at the top surfaces and the floor panel 584 at the bottom surfaces, which may together seal the upper and lower portions of the battery containment area 522. The generally flush top surface provided by the consistent peripheral wall height may also allow an upper peripheral flange that extends from one embodiment of the tub insert to engage around the top surface of the peripheral wall of the base frame, such that a cover panel can attach at the upper peripheral flange, such as to sandwich the upper peripheral flange between the base frame and the cover panel and thereby seal the upper peripheral edge of the battery tray. Similarly, the cross members 580 may be formed to have a height substantially equal to the height of the peripheral walls, which may also be used to provide a seal at the cover panel around the individual battery compartments. Features of the battery tray 510 that are similar to the battery tray 10 are not described in detail again, and similar reference numbers are used, incremented by 500.

Figure 30:
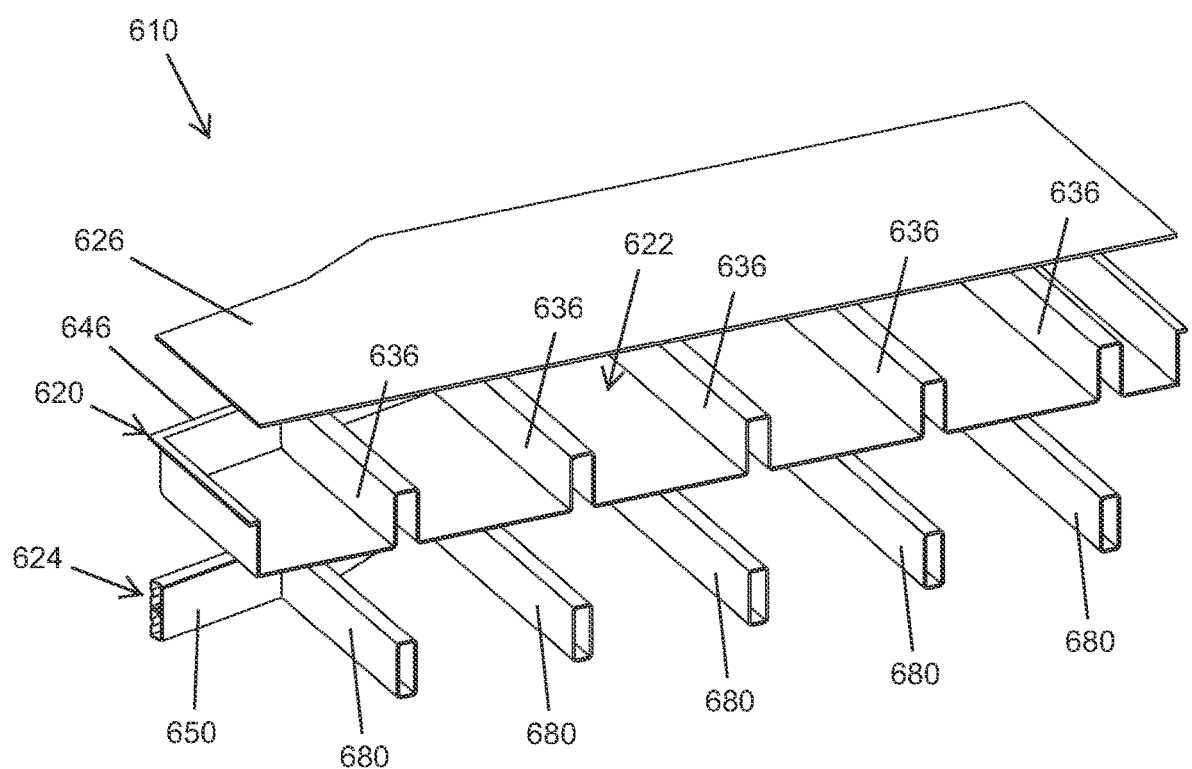
FIG. 30 is a cross-sectional, upper perspective view of an additional embodiment of a battery tray, showing the cross section taken centrally along a length of the battery tray.

In yet another embodiment, as shown in FIG. 30, a battery tray 610 is provided that has a support structure 624 that includes cross members 680 that span laterally between longitudinal sections or member 650 to form a ladder-like base frame structure that is generally without cross members or lateral members at the ends of the support structure 624. To correspond with this structure, the tub component 620 has recesses protruding upward into the cross member portions 636 of the tub component 620 to mate with and over the cross members 680 of the support structure 624. A flange 646 of the tub component 620 is configured to engage an upper surface of the longitudinal members 650. Features of the battery tray 610 that are similar to the battery tray 10 are not described in detail again, and similar reference numbers are used, incremented by 600.

Several different attachment techniques and configurations may be used to permanently or releasable secure the battery support structure to a vehicle frame, such as below a floor of the vehicle and generally between the axles. Further, with respect to the general installation or attachment or formation, the steps discussed herein may be performed in various different sequences from those discussed to result in engaging, disengaging, or forming the battery support structure or components thereof For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A battery tray for an electric vehicle, the battery tray comprising:
    a tub component defining a battery containment area, the tub component comprising:
        a floor portion forming a bottom of the battery containment area,
        a perimeter wall portion integrally extending upward from a peripheral edge of the floor portion and bordering the battery containment area, and
        a flange portion integrally extending from an upper section of the perimeter wall portion and protruding outward from the battery containment area;
        wherein the floor portion, perimeter wall portion, and flange portion together comprise a single integral piece; and
    a cover formed from a single distinct piece and comprising a peripheral mating surface that extends around a perimeter of the cover, wherein the peripheral mating surface is attached at the flange portion of the tub component to enclose an upper opening of the battery containment area.

2. The battery tray of claim 1, wherein the perimeter wall portion comprises longitudinal sections that are configured to extend longitudinally relative to the electric vehicle.

3. The battery tray of claim 2, wherein the flange portion is disposed at least along the longitudinal sections of the perimeter wall portion.

4. The battery tray of claim 2, wherein the perimeter wall portion comprises lateral sections that are configured to extend laterally relative to the electric vehicle, the lateral sections void of the flange portion.

5. The battery tray of claim 2, further comprising a support structure having an elongated member attached at an exterior side of each of the longitudinal sections of the perimeter wall portion of the tub component.

6. The battery tray of claim 2, wherein the tub component comprises a cross member spanning between the longitudinal sections of the perimeter wall portion.

7. The battery tray of claim 6, wherein the cross member integrally interconnects with the floor portion and the perimeter wall portion, and wherein the cross member extends across the battery containment area to divide the battery containment area into separate compartments.

8. The battery tray of claim 1, wherein the perimeter wall portion surrounds the battery containment area, wherein the flange portion is disposed along a top end of the perimeter wall portion to form an upper peripheral edge, and wherein the cover attaches at the upper peripheral edge formed by the flange portion to seal the battery containment area.

9. The battery tray of claim 1, wherein the single integral piece of the tub component is formed from at least one of a polymer, carbon fibers, an aluminum alloy, or a steel alloy.

10. A battery tray for an electric vehicle, the battery tray comprising:
    a tub component defining a battery containment area configured to hold battery modules that operate the electric vehicle; and
    a cover formed from a single distinct piece,
    wherein the tub component comprises a floor portion, a perimeter wall portion integrally extending upward from and along a peripheral edge of the floor portion, and a flange portion integrally and extending from an upper section of the perimeter wall portion, wherein the flange portion engages a mating surface of the cover that is disposed along a perimeter of the cover to enclose the battery containment area; and
    wherein the floor portion, perimeter wall portion, and flange portion together comprise a single integral piece.

11. The battery tray of claim 10, wherein the cover encloses an upper opening of the battery containment area.

12. The battery tray of claim 10, wherein the flange portion is disposed at least along longitudinal sections of the perimeter wall portion, wherein the flange portion protrudes outward from the battery containment area along the longitudinal sections of the perimeter wall portion.

13. The battery tray of claim 12, further comprising a support structure that includes elongated members disposed at exterior sides of the longitudinal sections of the perimeter wall portion, wherein the flange portion of the tub component engages the elongated members.

14. The battery tray of claim 10, wherein the tub component comprises a cross member portion integrally extending between longitudinal sections of the perimeter wall portion, the cross member portion forming part of the single integral piece.

15. The battery tray of claim 10, wherein the single integral piece of the tub component is formed from at least one of a polymer, a sheet molding compound, an aluminum alloy, or a steel alloy.

16. A battery tray for an electric vehicle, the battery tray comprising:
    a tub component defining a battery containment area;
    wherein the tub component comprises a panel portion, a perimeter wall portion integrally extending vertically from a peripheral edge of the panel portion and bordering the battery containment area, and a flange portion integrally extending outward from the perimeter wall portion;
    wherein the panel portion, the perimeter wall portion, and the flange portion together comprise a single integral piece; and
    a cover formed from a single distinct piece and including a mating surface that extends continuously along a perimeter of the cover, wherein the mating surface continuously engages the flange portion along the perimeter of the cover to enclose the battery containment area.

17. The battery tray of claim 16, wherein the panel portion is disposed along a bottom end of the perimeter wall portion to form a bottom of the battery containment area, and wherein the flange portion is disposed along a top end of the perimeter wall portion to form an upper peripheral edge.

18. The battery tray of claim 17, wherein the cover attaches at the upper peripheral edge formed by the flange portion and seals the battery containment area.

19. The battery tray of claim 16, wherein the tub component comprises a plurality of cross member portions that integrally interconnect with the panel portion and the perimeter wall portion so as to span laterally across the battery containment area to divide the battery containment area into separate compartments.

20. The battery tray of claim 16, wherein the single integral piece of the tub component is formed from at least one of a polymer, carbon fibers, or a metal sheet.

* * * * *